US012142209B2

(12) United States Patent
Song et al.

(10) Patent No.: US 12,142,209 B2
(45) Date of Patent: Nov. 12, 2024

(54) PIXEL AND DISPLAY APPARATUS HAVING THE SAME

(71) Applicant: Samsung Display Co., Ltd., Yongin-Si (KR)

(72) Inventors: Heerim Song, Seoul (KR); Mukyung Jeon, Ulsan (KR); Heejean Park, Suwon-si (KR); Yujin Lee, Suwon-si (KR); Cheol-Gon Lee, Suwon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/583,005

(22) Filed: Jan. 24, 2022

(65) Prior Publication Data

US 2022/0343844 A1 Oct. 27, 2022

(30) Foreign Application Priority Data

Apr. 27, 2021 (KR) ........................ 10-2021-0054532

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0819* (2013.01); *G09G 2300/0842* (2013.01); *G09G 2300/0861* (2013.01); *G09G 2310/08* (2013.01); *G09G 2320/0214* (2013.01); *G09G 2320/0247* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 8,217,868 B2 * | 7/2012 | Shin | G09G 3/3233 | 345/82 |
| 8,836,615 B2 * | 9/2014 | Schemmann | G09G 3/3258 | 345/76 |
| 10,276,094 B2 * | 4/2019 | Xiang | G09G 3/3258 | |
| 11,386,854 B2 | 7/2022 | Kim et al. | | |
| 2009/0219231 A1 * | 9/2009 | Yamamoto | G09G 3/3233 | 345/76 |
| 2009/0284453 A1 * | 11/2009 | Shin | G09G 3/3233 | 345/82 |

(Continued)

FOREIGN PATENT DOCUMENTS

| | | |
|---|---|---|
| KR | 10-2020-0019306 A | 2/2020 |
| KR | 10-2072678 B1 | 2/2020 |

*Primary Examiner* — Dorothy Harris
(74) *Attorney, Agent, or Firm* — Innovation Counsel LLP

(57) ABSTRACT

A pixel includes a light emitting element, a driving switching element, an initialization voltage terminal, a data initialization switching element set, and an adjustment switching element. The driving switching element may provide a driving current to the light emitting element. The adjustment switching element is electrically connected to the data initialization switching element in series. At least one of the data initialization switching element set and the adjustment switching element may control an electrical connection between the control electrode of the driving switching element and the initialization voltage terminal. A control electrode of the adjustment switching element is electrically connected to an input electrode of the adjustment switching element.

18 Claims, 21 Drawing Sheets

(56) References Cited

U.S. PATENT DOCUMENTS

| | | | | |
|---|---|---|---|---|
| 2011/0115772 | A1* | 5/2011 | Chung | G09G 3/3233 345/76 |
| 2012/0001893 | A1* | 1/2012 | Jeong | G09G 3/3233 345/76 |
| 2013/0021316 | A1* | 1/2013 | Inoue | G09G 3/3233 345/212 |
| 2014/0225881 | A1* | 8/2014 | Takahashi | G09G 3/3614 345/209 |
| 2016/0027363 | A1* | 1/2016 | Lee | G09G 3/2003 345/691 |
| 2016/0035283 | A1* | 2/2016 | Park | G09G 3/3258 345/78 |
| 2017/0053591 | A1* | 2/2017 | Seo | G09G 3/3225 |
| 2017/0110049 | A1* | 4/2017 | Choi | G09G 3/3233 |
| 2017/0148383 | A1* | 5/2017 | Kim | G09G 3/3275 |
| 2017/0186372 | A1* | 6/2017 | Yanase | G09G 3/3233 |
| 2017/0236469 | A1* | 8/2017 | Wang | G09G 3/3233 345/212 |
| 2018/0151115 | A1* | 5/2018 | Tseng | G09G 3/3233 |
| 2019/0057648 | A1* | 2/2019 | Xu | G09G 3/3275 |
| 2019/0130823 | A1* | 5/2019 | Yang | G09G 3/3225 |
| 2020/0410933 | A1* | 12/2020 | Kobayashi | G09G 3/3233 |
| 2021/0201827 | A1* | 7/2021 | Jang | G09G 3/3291 |

* cited by examiner

PIXEL AND DISPLAY APPARATUS HAVING THE SAME

PRIORITY STATEMENT

This application claims priority under 35 U.S.C. § 119 to Korean Patent Application No. 10-2021-0054532, filed on Apr. 27, 2021 in the Korean Intellectual Property Office (KIPO); the Korean Patent Application is incorporated by reference.

BACKGROUND

1. Field

The technical field relates to a pixel and a display apparatus including the pixel.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver, a data driver, an emission driver, and a driving controller. The gate driver outputs gate signals to the gate lines. The data driver outputs data voltages to the data lines. The emission driver outputs emission signals to the emission lines. The driving controller controls the gate driver, the data driver, and the emission driver.

When an image displayed on the display panel is a static image, a driving frequency of the display panel may be decreased to reduce the power consumption of the display panel.

When the driving frequency of the display panel is decreased, a flicker may occur in the displayed image due to current leakage in the display panel. As a result, the quality of the displayed image may be unsatisfactory.

SUMMARY

Embodiments may be related to a pixel that requires minimum power consumption and enables satisfactory image quality.

Embodiments may be related to a display apparatus including the pixel.

In an embodiment, the pixel includes a light emitting element, a driving switching element, a data initialization switching element and a compensation switching element. The driving switching element is configured to apply a driving current to the light emitting element. The data initialization switching element is disposed between a control electrode of the driving switching element and an initialization voltage terminal. The compensation switching element is disposed between the control electrode of the driving switching element and the initialization voltage terminal. The compensation switching element is connected to the data initialization switching element in series. A control electrode of the compensation switching element is connected to an input electrode of the compensation switching element.

The pixel may further include a writing switching element configured to apply a data voltage to an input electrode of the driving switching element and a light emitting element initialization switching element configured to initialize a first electrode of the light emitting element.

An active period of a first gate signal applied to a control electrode of the data initialization switching element, an active period of a second gate signal applied to a control electrode of the writing switching element and an active period of a third gate signal applied to a control electrode of the light emitting element initialization switching element may have different timings from one another.

An active period of a first gate signal applied to a control electrode of the data initialization switching element and an active period of a second gate signal applied to a control electrode of the writing switching element may have different timings from each other. The active period of the second gate signal and an active period of a third gate signal applied to a control electrode of the light emitting element initialization switching element may have substantially the same timing.

An active period of a first gate signal applied to a control electrode of the data initialization switching element and an active period of a second gate signal applied to a control electrode of the writing switching element may have different timings from each other. The active period of the first gate signal and an active period of a third gate signal applied to a control electrode of the light emitting element initialization switching element may have substantially the same timing.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a 4-1 pixel switching element including a control electrode configured to receive a data initialization gate signal, an input electrode connected to a second floating node and an output electrode connected to the first node, a 4-2 pixel switching element including a control electrode configured to receive the data initialization gate signal, an input electrode connected to a fourth node and an output electrode connected to the second floating node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element may include the 4-1 pixel switching element and the 4-2 pixel switching element.

The pixel may further include a storage capacitor including a first electrode configured to receive the first power voltage and a second electrode connected to the first node.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a fourth pixel switching element including a control electrode configured to receive a data initialization gate signal, an input electrode connected to a fourth node and an output electrode connected to the first node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element is the fourth pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a third pixel switching element including a control electrode configured to receive a compensation gate signal, an input electrode connected to the first node and an output electrode connected to the third node, a fourth pixel switching element including a control electrode configured to receive a data initialization gate signal, an input electrode connected to a fourth node and an output electrode connected to the first node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element is the fourth pixel switching element.

The pixel may include a P-type transistor and an N-type transistor.

At least one of the third pixel switching element, the fourth pixel switching element and the seventh pixel switching element may be an N-type transistor.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a 4-1 pixel switching element including a control electrode configured to receive a data initialization gate signal, an input electrode connected to a second floating node and an output electrode connected to the first node, a 4-2 pixel switching element including a control electrode configured to receive the data initialization gate signal, an input electrode connected to a fourth node and an output electrode connected to the second floating node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to a second initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element may include the 4-1 pixel switching element and the 4-2 pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a fourth pixel switching element including a control electrode configured to receive a data initialization gate signal, an input electrode connected to a fourth node and an output electrode connected to the first node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to a second initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element is the fourth pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a third pixel switching element including a control electrode configured to receive a compensation gate signal, an input electrode connected to the first node and an output electrode connected to the third node, a fourth pixel switching element including a control electrode configured to receive a data initialization gate signal, an input electrode connected to a fourth node and an output electrode connected to the first node, the compensation switching element including a control electrode connected to the initialization voltage terminal, an input electrode connected to the initialization voltage terminal and an output electrode connected to the fourth node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to a second initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element is the fourth pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a 4-1 pixel switching element including a control electrode configured to receive a data initialization gate signal, an input electrode connected to a second floating node and an output electrode connected to a fourth node, a 4-2 pixel switching element including a control electrode configured to receive the data initialization gate signal, an input electrode connected to the initialization voltage terminal and an output electrode connected to the second floating node, the compensation switching element including a control electrode connected to the fourth node, an input electrode connected to the fourth node and an output electrode connected to the first node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element may include the 4-1 pixel switching element and the 4-2 pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a 3-1 pixel switching element including a control electrode configured to receive a compensation gate signal, an input electrode connected to the first node and an output electrode connected to a first floating node, a 3-2 pixel switching element including a control electrode configured to receive the compensation gate signal, an input electrode connected to the first floating node and an output electrode connected to the third node, a fourth pixel switching element including a control electrode configured to receive a data initialization gate signal, an input electrode connected to the initialization voltage terminal and an output electrode connected to a fourth node, the compensation switching element including a control electrode connected to the fourth node, an input electrode connected to the fourth node and an output electrode connected to the first node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element may be the fourth pixel switching element.

The pixel may include a first pixel switching element including a control electrode connected to a first node, an input electrode connected to a second node and an output electrode connected to a third node, a second pixel switching element including a control electrode configured to receive a data write gate signal, an input electrode configured to receive a data voltage and an output electrode connected to the second node, a third pixel switching element including a control electrode configured to receive a compensation gate signal, an input electrode connected to the first node and an output electrode connected to the third node, a fourth pixel switching element including a control electrode configured to receive a data initialization gate signal, an input electrode connected to the initialization voltage terminal and an output electrode connected to a fourth node, the compensation switching element including a control electrode connected to the fourth node, an input electrode connected to the fourth node and an output electrode connected to the first node, a fifth pixel switching element including a control electrode configured to receive an emission signal, an input electrode configured to receive a first power voltage and an output electrode connected to the second node, a sixth pixel switching element including a control electrode configured to receive the emission signal, an input electrode connected to the third node and an output electrode connected to an anode electrode of the light emitting element, a seventh pixel switching element including a control electrode configured to receive a light emitting element initialization gate signal, an input electrode connected to the initialization voltage terminal and an output electrode connected to the anode electrode of the light emitting element and the light emitting element including the anode electrode and a cathode electrode configured to receive a second power voltage. The driving switching element may be the first pixel switching element. The data initialization switching element may be the fourth pixel switching element.

In an embodiment of a display apparatus according to the present inventive concept, the display apparatus includes a display panel, a gate driver, a data driver and an emission driver. The display panel includes a pixel. The gate driver is configured to output a gate signal to the pixel. The data driver is configured to output a data voltage to the pixel. The emission driver is configured to output an emission signal to the pixel. The pixel includes a light emitting element, a driving switching element, a data initialization switching element and a compensation switching element. The driving switching element is configured to apply a driving current to the light emitting element. The data initialization switching element is disposed between a control electrode of the driving switching element and an initialization voltage terminal. The compensation switching element is disposed between the control electrode of the driving switching element and the initialization voltage terminal. The compensation switching element is connected to the data initialization switching element in series. A control electrode of the compensation switching element is connected to an input electrode of the compensation switching element.

The data initialization switching element may be disposed between the control electrode of the driving switching element and an output electrode of the compensation switching element. The compensation switching element may be disposed between an input electrode of the data initialization switching element and the initialization voltage terminal.

The data initialization switching element may include a first data initialization switching element and a second data initialization switching element which are connected to each other in series.

The data initialization switching element may be disposed between the input electrode of the compensation switching element and the initialization voltage terminal. The compensation switching element may be disposed between the control electrode of the driving switching element and an output electrode of the data initialization switching element.

An embodiment may be related to a pixel. The pixel may include a light emitting element, a driving switching element, an initialization voltage terminal, a data initialization switching element set, and a compensation/adjustment switching element. The driving switching element may provide a driving current to the light emitting element. The compensation/adjustment switching element may be electrically connected to the data initialization switching element set in series. At least one of the data initialization switching element set and the compensation/adjustment switching element may control an electrical connection between the control electrode of the driving switching element and the initialization voltage terminal. A control electrode of the compensation/adjustment switching element may be electrically connected to an input electrode of the compensation/adjustment switching element.

The pixel may include the following elements: a writing switching element configured to provide a data voltage to an input electrode of the driving switching element; and a light emitting element initialization switching element configured to initialize a first electrode of the light emitting element.

A timing of an active period of a first gate signal provided to a control electrode of the data initialization switching element set, a timing of an active period of a second gate signal provided to a control electrode of the writing switching element, and a timing of an active period of a third gate signal provided to a control electrode of the light emitting element initialization switching element may be different from one another.

A timing of an active period of a first gate signal provided to a control electrode of the data initialization switching element set may be different from a timing of an active period of a second gate signal provided to a control electrode of the writing switching element. The active period of the second gate signal may coincide with an active period of a third gate signal provided to a control electrode of the light emitting element initialization switching element.

A timing of an active period of a first gate signal provided to a control electrode of the data initialization switching element set may be different from a timing of an active period of a second gate signal provided to a control electrode of the writing switching element. The active period of the first gate signal may coincide with an active period of a third gate signal provided to a control electrode of the light emitting element initialization switching element.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a first data initialization switching element and a second data initialization switching element. The first data initialization switching element may include a control electrode configured to receive a first instance of a data initialization gate signal, an input electrode electrically connected to a second floating node, and an output electrode electrically connected to the first node. The second data initialization switching element may include a control electrode configured to receive a second instance of the data initialization gate signal, an input electrode electrically connected to the fourth node, and an output electrode connected to the second floating node. The input electrode of the compensation/adjustment switching element may be electrically connected to the initialization voltage terminal. An output electrode of the compensation/adjustment switching element may be electrically connected to the fourth node.

The pixel may include the following element: a storage capacitor including a first electrode configured to receive the first power voltage and a second electrode electrically connected to the first node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the fourth node, and an output electrode electrically connected to the first node. The input electrode of the compensation/adjustment switching element may be electrically connected to the initialization voltage terminal. An output electrode of the compensation/adjustment switching element may be electrically connected to the fourth node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; an intermediary pixel switching element including a control electrode configured to receive a compensation/adjustment gate signal, an input electrode electrically connected to the first node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the fourth node, and an output electrode electrically connected to the first node. The input electrode of the compensation/adjustment switching element may be electrically connected to the initialization voltage terminal. An output electrode of the compensation/adjustment switching element may be electrically connected to the fourth node.

At least one of the intermediary pixel switching element, the data initialization switching element set, and the light emitting element initialization switching element may be an N-type transistor.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a second initialization voltage terminal; a light emitting element initialization switching element including a control electrode configured to receive a light emitting element initialization gate signal, an input electrode connected to the second initialization voltage terminal, and an output electrode connected to the anode electrode of the light emitting element; and a fourth node. A cathode of the light emitting element may be configured to receive a second power voltage. The data initialization switching element set may include a first data initialization switching element and a second data initialization switching element. The first data initialization switching element may include a control electrode configured to receive a first instance of a data initialization gate signal, an input electrode electrically connected to a second floating node, and an output electrode electrically connected to the first node. The second data initialization switching element may include a control electrode configured to receive a second instance of the data initialization gate signal, an input electrode electrically connected to the fourth node, and an output electrode connected to the second floating node. The input electrode of the compensation/adjustment switching element may be electrically connected to the initialization voltage terminal. An output electrode of the compensation/adjustment switching element may be electrically connected to the fourth node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a second initialization voltage terminal; a light emitting element initialization switching element including a control electrode configured to receive a light emitting element initialization gate signal, an input electrode electrically connected to the second initialization voltage terminal, and an output electrode electrically connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the fourth node, and an output electrode electrically connected to the first node. The input electrode of the compensation/adjustment switching element may be electrically connected to the initialization voltage terminal. An output electrode of the compensation/adjustment switching element may be electrically connected to the fourth node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; an intermediary pixel switching element including a control electrode configured to receive a compensation/adjustment gate signal, an input electrode electrically connected to the first node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a second initialization voltage terminal; a light emitting element initialization switching element including a control electrode configured to receive a light emitting element initialization gate signal, an input electrode electrically connected to the second initialization voltage terminal, and an output electrode connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the fourth node, and an output electrode electrically connected to the first node. The input electrode of the compensation/adjustment switching element may be electrically connected to the initialization voltage terminal. An output electrode of the compensation/adjustment switching element may be electrically connected to the fourth node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a first data initialization switching element and a second data initialization switching element. The first data initialization switching element may include a control electrode configured to receive a first instance of a data initialization gate signal, an input electrode electrically connected to a second floating node, and an output electrode electrically connected to the fourth node. The second data initialization switching element may include a control electrode configured to receive a second instance of the data initialization gate signal, an input electrode electrically connected to the initialization voltage terminal, and an output electrode connected to the second floating node. The input electrode of the compensation/adjustment switching element may be electrically connected to the fourth node. An output electrode of the compensation/adjustment switching element may be electrically connected to the first node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; a first intermediary switching element including a control electrode configured to receive a first instance of a compensation/adjustment gate signal, an input electrode electrically connected to the first node, and an output electrode electrically connected to a first floating node; a second intermediary switching element including a control electrode configured to receive a second instance of the compensation/adjustment gate signal, an input electrode electrically connected to the first floating node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the initialization voltage terminal, and an output electrode electrically connected to the fourth node. The input electrode of the compensation/adjustment switching element may be electrically connected to the fourth node. An output electrode of the compensation/adjustment switching element may be electrically connected to the first node.

The pixel may include the following elements: a first node electrically connected to the control electrode of the driving switching element; a second node electrically connected to an input electrode of the driving switching element; a third node electrically connected to an output electrode of the driving switching element; a writing switching element including a control electrode configured to receive a data write gate signal, an input electrode configured to receive a data voltage, and an output electrode electrically connected to the second node; an intermediary switching element including a control electrode configured to receive a compensation/adjustment gate signal, an input electrode electrically connected to the first node, and an output electrode electrically connected to the third node; a first emission control switching element including a control electrode configured to receive a first instance of an emission signal, an input electrode configured to receive a first power voltage, and an output electrode electrically connected to the second node; a second emission control switching element including a control electrode configured to receive a second instance of the emission signal, an input electrode electrically connected to the third node, and an output electrode connected to an anode electrode of the light emitting element; a light emitting element initialization switching element including a control electrode configured to receive a light emitting element initialization gate signal, an input electrode connected to the initialization voltage terminal, and an output electrode electrically connected to the anode electrode of the light emitting element; and a fourth node. A cathode of the light emitting element may be configured to receive a second power voltage. The data initialization switching element set may include a control electrode configured to receive a data initialization gate signal, an input electrode electrically connected to the initialization voltage terminal, and an output electrode electrically connected to the fourth node. The input electrode of the compensation/adjustment switching element may be electrically connected to the fourth node. An output electrode of the compensation/adjustment switching element may be electrically connected to the first node.

An embodiment may be related to a display apparatus. The display device may include the following elements: a display panel including a pixel; a gate driver configured to output a gate signal to the pixel; a data driver configured to output a data voltage to the pixel; and an emission driver configured to output an emission signal to the pixel. The pixel may include the following elements: a light emitting element; a driving switching element configured to provide a driving current to the light emitting element; an initialization voltage terminal; a data initialization switching element set; and a compensation/adjustment switching element electrically connected to the data initialization switching element in series. At least one of the data initialization switching element set and the compensation/adjustment switching element may control an electrical connection between the control electrode of the driving switching element and the initialization voltage terminal. A control electrode of the compensation/adjustment switching element may be electrically connected to an input electrode of the compensation/adjustment switching element.

The data initialization switching element set may control an electrical connection between the control electrode of the driving switching element and an output electrode of the compensation/adjustment switching element. The compensation/adjustment switching element may control an electrical connection between an input electrode of the data initialization switching element set and the initialization voltage terminal.

The data initialization switching element set may include a first data initialization switching element and a second data initialization switching element that are electrically connected to each other in series.

The data initialization switching element set may control an electrical connection between the input electrode of the compensation/adjustment switching element and the initialization voltage terminal. The compensation/adjustment switching element may control an electrical connection between the control electrode of the driving switching element and an output electrode of the data initialization switching element set.

According to embodiments, when an image displayed on a display panel is a static image, the driving frequency of the display panel may be decreased, so that the power consumption of the display apparatus may be minimized.

According to embodiments, a pixel includes a compensation switching element electrically connected between the control electrode of a driving switching element and an initialization voltage terminal, so that current leakage of the pixel may be reduced. Advantageously, no conspicuous flicker may occur in a displayed image, so that the quality of the displayed image may be satisfactory.

According to embodiments, a data initialization switching element electrically connected between a driving switching element and a initialization voltage terminal is a single transistor instead of multiple transistors, and a compensation switching element is electrically connected to the data initialization switching element in series, so that the data initialization switching element may not include any floating node between data initialization transistors. Advantageously, current leakage may be minimized, so that satisfactory image quality may be attained.

DETAILED DESCRIPTION

Examples of embodiments are described with reference to the accompanying drawings.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "electrically connect." The term "connected" may mean "electrically connected" and/or "electrically connected through no intervening transistor." The term "insulate" may mean "electrically insulate" or "electrically isolate." The term "conductive" may mean "electrically conductive." The term "drive" may mean "operate" or "control." The term "adjacent" may mean "immediately adjacent." The expression that an element extends in a particular direction may mean that the element extends lengthwise in the particular direction and/or that the lengthwise direction of the element is in the particular direction. The term "pixel switching element" may mean "switching element." The term "3-1 pixel switching element" may mean "first third-set/type switching element" and/or "first intermediary switching element." The term "3-2 pixel switching element" may mean "second third-set/type switching element" and/or "second intermediary switching element." The term "4-1 pixel switching element" may mean "first fourth-set/type switching element" and/or "first data initialization switching element." The term "4-2 pixel switching element" may mean "second fourth-set/type switching element" and/or "second data initialization switching element." A "set" may include zero, one, or more items/elements. An "element" may mean "element set" that includes one or more analogous elements. The expression that a switching element is disposed between first element and a second element may mean that an input electrode of the switching element and an output electrode of the switching element are respectively electrically connected to the first element and the second element and that the switching element controls an electrical connection between the first element and the second element. A voltage or signal may mean an instance or copy of the voltage or signal. The term "duration" may mean "period." The term "compensate" may mean "adjust." The term "compensation" may mean "adjustment."

Figure 1:
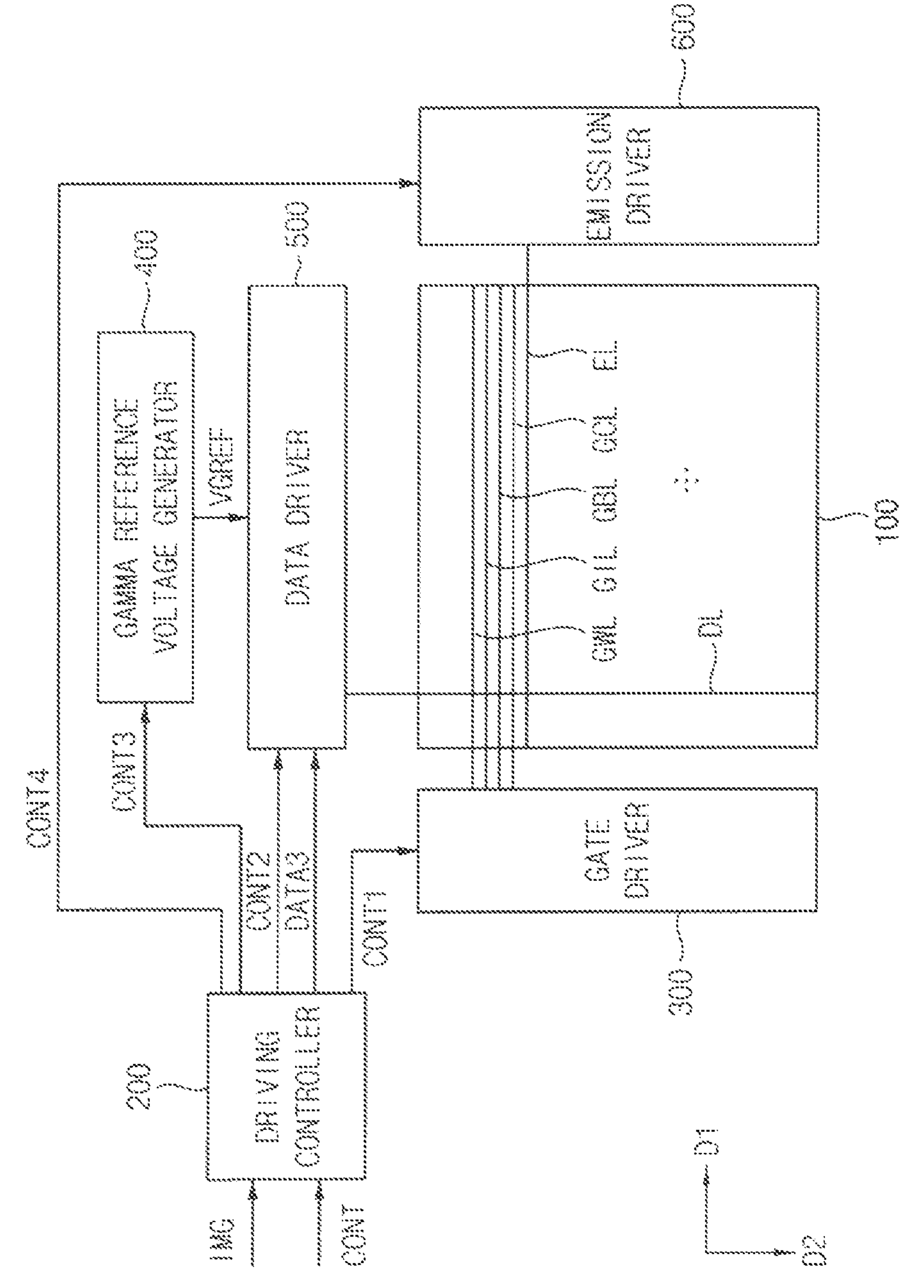
FIG. 1 is a block diagram illustrating a display apparatus according to an embodiment.

FIG. 1 is a block diagram illustrating a display apparatus according to an embodiment.

Referring to FIG. 1, the display apparatus includes a display panel 100 and a display panel driver. The display panel driver includes a driving controller 200, a gate driver 300, a gamma reference voltage generator 400, a data driver 500, and an emission driver 600.

The display panel 100 has a display region for displaying an image and has a peripheral region adjacent to the display region.

The display panel 100 includes a plurality of gate lines GWL, GIL, GBL and GCL, a plurality of data lines DL, a plurality of emission lines EL and a plurality of pixels electrically connected to the gate lines GWL, GIL, GBL and GCL, the data lines DL, and the emission lines EL. The gate lines GWL, GIL, GBL and GCL may extend in a first direction D1, the data lines DL may extend in a second direction D2 different from the first direction D1, and the emission lines EL may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 based on the input control signal CONT, and outputs the first control signal CONT1 to the gate driver 300 for controlling the gate driver 300. The first control signal CONT1 may include a vertical start signal and a gate clock signal.

The driving controller 200 generates the second control signal CONT2 based on the input control signal CONT, and outputs the second control signal CONT2 to the data driver 500 for controlling the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 based on the input control signal CONT, and outputs the third control signal CONT3 to the gamma reference voltage generator 400 for controlling the gamma reference voltage generator 400.

The driving controller 200 generates the fourth control signal CONT4 based on the input control signal CONT, and outputs the fourth control signal CONT4 to the emission driver 600 for controlling the emission driver 600.

The gate driver 300 generates gate signals in response to the first control signal CONT1 received from the driving controller 200. The gate driver 300 may sequentially output the gate signals to the gate lines GWL, GIL, GBL and GCL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

The gamma reference voltage VGREF has a value corresponding to a level of the data signal DATA.

The gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

The emission driver 600 generates emission signals in response to the fourth control signal CONT4 received from the driving controller 200. The emission driver 600 may output the emission signals to the emission lines EL.

In FIG. 1, the gate driver 300 is disposed at a first side of the display panel 100, and the emission driver 600 is disposed at a second side of the display panel 100 opposite the first side. Both of the gate driver 300 and the emission driver 600 may be disposed at the first side of the display panel 100. The gate driver 300 and the emission driver 600 may be integrally formed.

Figure 2:
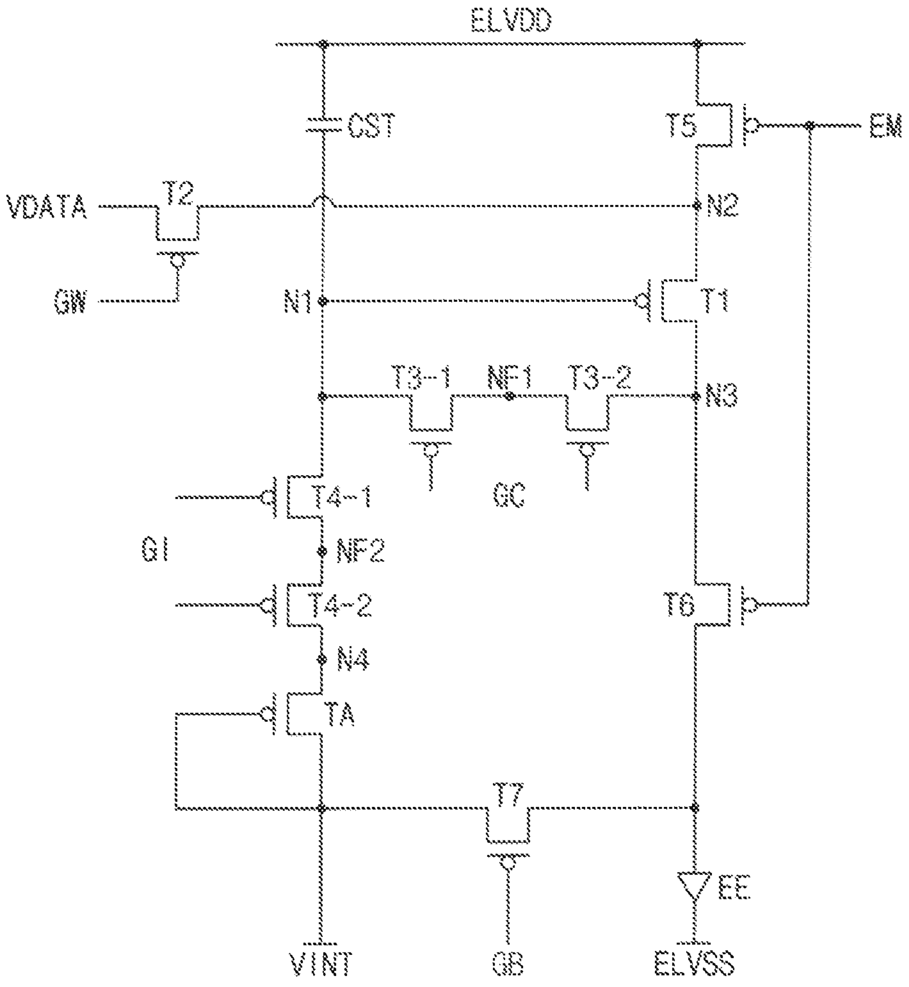
FIG. 2 is a circuit diagram illustrating a pixel of a display panel of FIG. 1 according to an embodiment.
Figure 3:
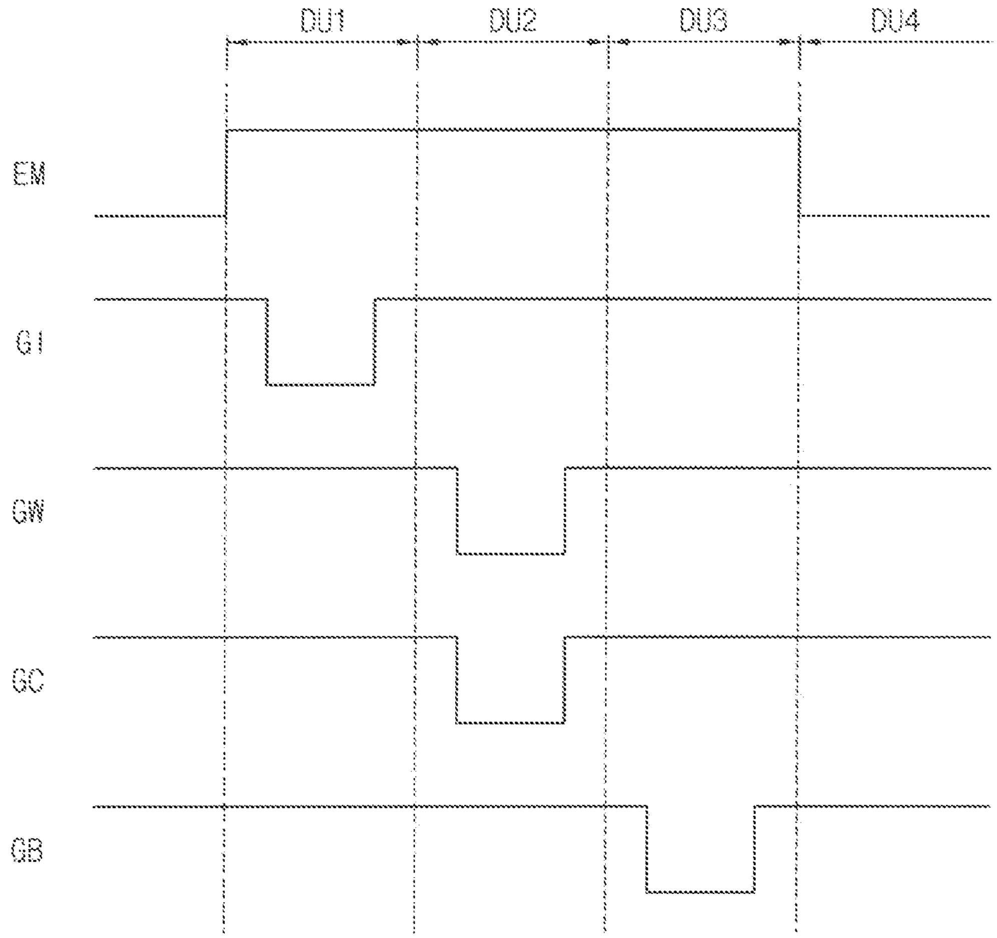
FIG. 3 is a timing diagram illustrating input signals applied to the pixel of FIG. 2 according to an embodiment.

FIG. 2 is a circuit diagram illustrating a pixel of the display panel 100 of FIG. 1 according to an embodiment. FIG. 3 is a timing diagram illustrating input signals applied to the pixel of FIG. 2 according to an embodiment.

Referring to FIGS. 1 to 3, the display panel 100 may include pixels analogous to the pixel of FIG. 2. Each pixel includes a light emitting element EE.

The pixel receives a data write gate signal GW, a compensation/adjustment gate signal GC, a data initialization gate signal GI, a light emitting element initialization gate signal GB, the data voltage VDATA, and the emission signal EM; the light emitting element EE of the pixel emits light corresponding to the level of the data voltage VDATA to enable the display panel 100 to display an image.

The pixel may include the light emitting element EE, a driving switching element (e.g. T1), a data initialization switching element (e.g. T4-1 and T4-2), and a compensation/adjustment switching element (e.g. TA). The driving switching element (e.g. T1) may apply a driving current to the light emitting element EE. The data initialization switching element (e.g. T4-1 and T4-2) may be disposed between a control electrode of the driving switching element (e.g. T1) and an initialization voltage terminal, which may receive an initialization voltage VINT. The compensation switching element (e.g. TA) may be disposed between the control electrode of the driving switching element (e.g. T1) and the initialization voltage terminal. The compensation switching element (e.g. TA) may be connected to the data initialization switching element (e.g. T4-1 and T4-2) in series. A control electrode of the compensation switching element (e.g. TA) may be connected to an input electrode of the compensation switching element (e.g. TA). The data initialization switching element may include a first data initialization switching element T4-1 and a second data initialization switching element T4-2.

The pixel may further include a writing switching element (e.g. T2) for applying the data voltage VDATA to an input electrode of the driving switching element (e.g. T1) and a light emitting element initialization switching element (e.g. T7) for initializing a first electrode (e.g., an anode) of the light emitting element EE.

The timing of an active period of a first gate signal (e.g. GI) applied to a control electrode of the data initialization switching element (e.g. T4-1 and T4-2), the timing of an active period of a second gate signal (e.g. GW) applied to a control electrode of the writing switching element (e.g. T2), and the timing of an active period of a third gate signal (e.g. GB) applied to a control electrode of the light emitting element initialization switching element (e.g. T7) may be different from one another.

The pixel may include first to seventh pixel switching elements T1 to T7, a storage capacitor CST, and the light emitting element EE.

The first pixel switching element T1 includes a control electrode connected to a first node N1, an input electrode connected to a second node N2, and an output electrode connected to a third node N3.

The second pixel switching element T2 includes a control electrode receiving the data write gate signal GW, an input electrode receiving the data voltage VDATA, and an output electrode connected to the second node N2.

The third pixel switching element (or intermediary switching element set) T3-1 and T3-2 includes a control electrode receiving the compensation gate signal GC, an input electrode connected to the first node N1, and an output electrode connected to the third node N3.

The third pixel switching element T3-1 and T3-2 may include two transistors connected in series. The third pixel switching element T3-1 and T3-2 may include a 3-1 pixel switching element T3-1 including a control electrode receiving the compensation gate signal GC, an input electrode connected to the first node N1, and an output electrode connected to a first floating node NF1 and may include a 3-2 pixel switching element T3-2 including a control electrode receiving the compensation gate signal GC, an input electrode connected to the first floating node NF1, and an output electrode connected to the third node N3.

The fourth pixel switching element (or data initialization switching element set) T4-1 and T4-2 may be disposed between the control electrode of the first pixel switching element T1 and the initialization voltage terminal.

The fourth pixel switching element T4-1 and T4-2 may include two transistors connected in series. The fourth pixel switching element T4-1 and T4-2 may include a 4-1 pixel switching element T4-1 including a control electrode receiving the data initialization gate signal GI, an input electrode connected to a second floating node NF2, and an output electrode connected to the first node N1 and may include a 4-2 pixel switching element T4-2 including a control electrode receiving the data initialization gate signal GI, an input electrode connected to a fourth node N4, and an output electrode connected to the second floating node NF2.

The fifth pixel switching element (or first emission control switching element) T5 includes a control electrode receiving the emission signal EM, an input electrode receiving a first power voltage ELVDD, and an output electrode connected to the second node N2.

The sixth pixel switching element (or second emission control switching element) T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE.

The first to seventh pixel switching elements T1 to T7 may be P-type thin film transistors. The control electrodes of the first to seventh pixel switching elements T1 to T7 may be gate electrodes, the input electrodes of the first to seventh pixel switching elements T1 to T7 may be source electrodes, and the output electrodes of the first to seventh pixel switching elements T1 to T7 may be drain electrodes.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less/lower than the first power voltage ELVDD.

Referring to FIG. 3, during a first duration DU1, the first node N1 and the storage capacitor CST may be initialized in response to the data initialization gate signal GI. During a second duration DU2, a threshold voltage |VTH| of the first pixel switching element T1 may be subtracted from the data voltage VDATA, and the resulted voltage may be written to the first node N1, in response to the data write gate signals GW and the compensation gate signal GC. During a third duration DU3, the anode electrode of the light emitting element EE may be initialized in response to the light emitting element initialization gate signal GB. During a fourth duration DU4, the light emitting element EE may emit the light in response to the emission signal EM, so that the display panel 100 may display an image.

In the first duration DU1, the data initialization gate signal GI may have an active level. The active level of the data initialization gate signal GI may be a low level. When the data initialization gate signal GI has the active level, the fourth pixel switching element T4-1 and T4-2 may be turned on, so that the initialization voltage VINT may be applied to the first node N1. As explained below, the level of the voltage at the fourth node N4 may increase by a threshold voltage of the compensation switching element TA due to the turned-on compensation switching element TA so that the initialization voltage VINT applied to the first node N1 may increase by the threshold voltage of the compensation switching element TA.

In the second duration DU2, the data write gate signal GW and the compensation gate signal GC may have active levels. The active level of the data write gate signal GW may be a low level, and the active level of the compensation gate signal GC may be a low level. When the data write gate signal GW and the compensation gate signal GC have the active levels, the second pixel switching element T2 and the third pixel switching elements T3-1 and T3-2 may be turned on. In addition, the first pixel switching element T1 may be turned on in response to the initialization voltage VINT.

The data write gate signal GW and the compensation gate signal GC may have exactly the same timing. The active period of the data write gate signal GW may completely or partially overlap with the active period of the compensation gate signal GC. The data write gate signal GW and the compensation gate signal GC may not have the same timing and/or may not coincide.

A voltage resulted from subtracting an absolute value |VTH| of the threshold voltage of the first pixel switching element T1 from the data voltage VDATA may be charged at the first node N1 along a path generated by the first to third pixel switching elements T1, T2, and T3-1 and T3-2.

In the third duration DU3, the light emitting element initialization gate signal GB may have an active level. The active level of the light emitting element initialization gate signal GB may be a low level. When the light emitting element initialization gate signal GB has the active level, the seventh pixel switching element T7 may be turned on, so that the initialization voltage VINT may be applied to the anode electrode of the light emitting element EE.

In the fourth duration DU4, the emission signal EM may have the active level. The active level of the emission signal EM may be a low level. When the emission signal EM has the active level, the fifth pixel switching element T5 and the sixth pixel switching element T6 may be turned on. In addition, the first pixel switching element T1 may be turned on by the data voltage VDATA.

A driving current may flow through the fifth pixel switching element T5, the first pixel switching element T1, and the sixth pixel switching element T6 to drive the light emitting element EE. An intensity of the driving current may be determined by the level of the data voltage VDATA. A luminance of the light emitting element EE may be determined by the intensity of the driving current. The driving current ISD flowing through a path from the input electrode to the output electrode of the first pixel switching element T1 may be represented by following Equation 1.

$$ISD = \frac{1}{2}\mu Cox\frac{W}{L}(VSG - |VTH|)^2 \quad \text{[Equation 1]}$$

In Equation 1, μ is a mobility of the first pixel switching element T1. Cox is a capacitance per unit area of the first pixel switching element T1. W/L is a width to length ratio of the first pixel switching element T1. VSG is a voltage between the input electrode N2 of the first pixel switching element T1 and the control node N1 of the first pixel switching element T1. |VTH| is the threshold voltage of the first pixel switching element T1.

The voltage VG of the first node N1 after the application of the threshold voltage |VTH| in the second duration DU2 may be represented as following Equation 2.

$$VG = \text{VDATA} - |VTH| \quad \text{[Equation 2]}$$

When the light emitting element EE emits the light in the fourth duration DU4, the driving voltage VOV and the driving current ISD may be represented by following Equations 3 and 4. In Equation 3, VS is a voltage of the second node N2.

$$VOV = VS - VG - |VTH| = ELVDD - (\text{VDATA} - |VTH|) - |VTH| = ELVDD - \text{VDATA} \quad \text{[Equation 3]}$$

$$ISD = \frac{1}{2}\mu Cox\frac{W}{L}(ELVDD - VDATA)^2 \quad \text{[Equation 4]}$$

The threshold voltage |VTH| is applied during the second duration DU2, so that the driving current ISD may be determined regardless of the threshold voltage |VTH| of the first pixel switching element T1 when the light emitting element EE emits the light during the third duration DU3.

In an initialization step (DU3) of the light emitting element EE, the voltage at the anode electrode of the light emitting element EE may have a level of the initialization voltage VINT.

In an emission step (DU4) of the light emitting element EE, the voltage at the anode electrode of the light emitting element EE may gradually increase.

In the initialization step (DU3) of the light emitting element EE, the level of the voltage at the anode electrode of the light emitting element EE must be sufficiently low, so that the light emitting element EE may not be turned on by the leakage current. The initialization of the light emitting element EE may also be referred to a black compensation.

In the initialization step (DU3) of the light emitting element EE, the level of the initialization voltage VINT may be less than or equal to a sum of the second power voltage ELVSS applied to the cathode electrode of the light emitting element EE and a threshold voltage of the light emitting element EE.

In the initialization step (DU3) of the light emitting element EE, the level of the initialization voltage VINT may be substantially equal to a level of the second power voltage ELVSS applied to the cathode electrode of the light emitting element EE.

When the level of the initialization voltage initializing the voltage at the first node N1 and the storage capacitor CST in a data initialization step (DU1) is too low, a charging rate of the voltage (VG=VDATA−|VTH|) written to the first node N1 in a data writing step (DU2) may become insufficient, and the threshold voltage |VTH| of the first pixel switching element T1 may not be sufficiently applied and/or adjusted.

As the level of the second power voltage ELVSS is decreased for a high luminance emission, the level of the initialization voltage VINT in the third duration DU3 may decrease. When the level of the initialization voltage VINT in the third duration DU3 is also used in the first duration DU1, problems of the insufficient charging rate of the data voltage VDATA and the compensation error of the threshold voltage may be exacerbated in the second duration DU2. A stain may be generated in the image displayed on the display panel 100 due to the insufficient charging rate of the data voltage VDATA and the compensation error of the threshold voltage.

The pixel may include the compensation switching element TA disposed between the initialization voltage terminal and the 4-2 pixel switching element T4-2. The control electrode and the input electrode of the compensation switching element TA are connected to each other. The level of the voltage at the fourth node N4 may increase by a threshold voltage of the compensation switching element TA.

The voltage initializing the control electrode of the first pixel switching element T1 and the voltage initializing the anode electrode of the light emitting element EE may become different due to the compensation switching element TA, so that the black compensation, a charging rate of the data voltage and the application and/or adjustment of the threshold voltage may be enhanced.

The level of the voltage at the fourth node N4 may increase by the threshold voltage of the compensation switching element TA, so that a level of a drain-source voltage of the fourth pixel switching element T4-1 and T4-2 may decrease. When the level of the drain-source voltage of the fourth pixel switching element T4-1 and T4-2 decreases, the current leakage of the fourth pixel switching element T4-1 and T4-2 may decrease.

According to embodiments, when an image displayed on the display panel 100 is a static image and/or when the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, no conspicuous flicker may appear in displayed images, so that the image display quality of the display panel 100 may be satisfactory.

Figure 4:
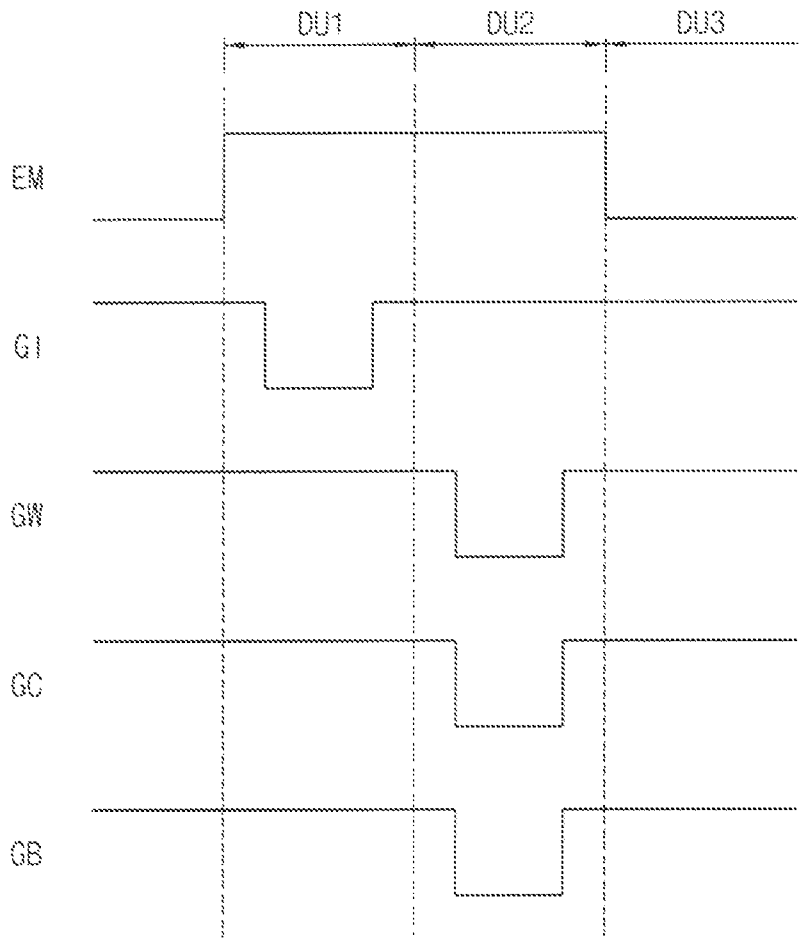
FIG. 4 is a timing diagram illustrating input signals applied to a pixel of a display panel of a display apparatus according to an embodiment.

FIG. 4 is a timing diagram illustrating input signals applied to a pixel of a display panel of a display apparatus according to an embodiment.

Referring to FIGS. 1, 2, and 4, the display panel 100 includes pixels analogous to the pixel of FIG. 2. Each pixel includes a light emitting element EE.

The pixel receives a data write gate signal GW, a compensation/adjustment gate signal GC, a data initialization gate signal GI, a light emitting element initialization gate signal GB, the data voltage VDATA and the emission signal EM, and the light emitting element EE of the pixel emits light corresponding to the level of the data voltage VDATA to display an image.

The timing of an active period of a first gate signal (e.g. GI) applied to a control electrode of the data initialization switching element (e.g. T4-1 and T4-2) and the timing of an active period of a second gate signal (e.g. GW) applied to a control electrode of the writing switching element (e.g. T2) may be different from each other.

The active period of the second gate signal (e.g. GW) and an active period of a third gate signal (e.g. GB) applied to a control electrode of the light emitting element initialization switching element (e.g. T7) may have substantially the same timing, may overlap with each other, and/or may coincide.

The control electrode of the writing switching element (e.g. T2) may be connected to the control electrode of the light emitting element initialization switching element (e.g. T7).

In FIG. 4, during a first duration DU1, the first node N1 and the storage capacitor CST may be initialized in response to the data initialization gate signal GI. During a second duration DU2, a threshold voltage |VTH| of the first pixel switching element T1 may be subtracted from the data voltage VDATA, and the resulted voltage may be written to the first node N1, in response to the data write gate signals GW and the compensation gate signal GC. During the second duration DU2, the anode electrode of the light emitting element EE may be initialized in response to the light emitting element initialization gate signal GB. During a third duration DU3, the light emitting element EE may emit the light in response to the emission signal EM so that the display panel 100 may display an image.

According embodiments, when an image displayed on the display panel 100 is a static image and/or when the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, no flicker may be conspicuous in displayed images, so that the image display quality of the display panel 100 may be satisfactory.

Figure 5:
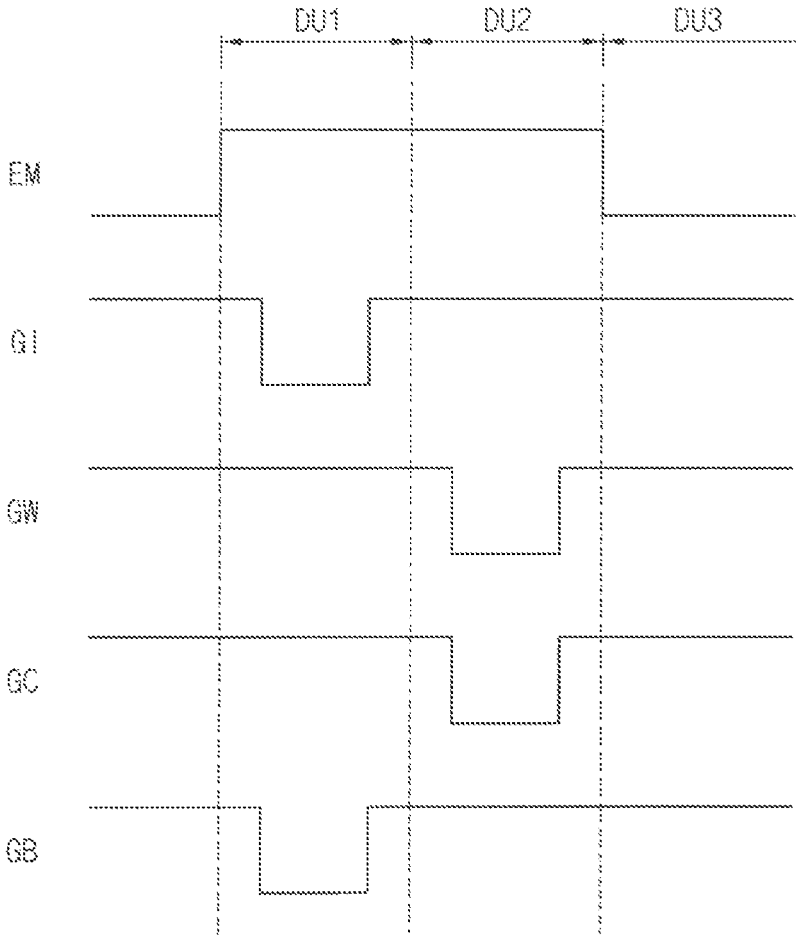
FIG. 5 is a timing diagram illustrating input signals applied to a pixel of a display panel of a display apparatus according to an embodiment.

FIG. 5 is a timing diagram illustrating input signals applied to a pixel of a display panel of a display apparatus according to an embodiment.

Referring to FIGS. 1, 2, and 5, the display panel 100 includes pixels analogous to the pixel of FIG. 2. Each pixel includes a light emitting element EE.

The pixel receives a data write gate signal GW, a compensation/adjustment gate signal GC, a data initialization gate signal GI, a light emitting element initialization gate signal GB, the data voltage VDATA and the emission signal EM and the light emitting element EE of the pixel emits light corresponding to the level of the data voltage VDATA to display an image.

The timing of an active period of a first gate signal (e.g. GI) applied to a control electrode of the data initialization switching element (e.g. T4-1 and T4-2) and the timing of an active period of a second gate signal (e.g. GW) applied to a control electrode of the writing switching element (e.g. T2) may be different from each other.

The active period of the first gate signal (e.g. GI) and an active period of a third gate signal (e.g. GB) applied to a control electrode of the light emitting element initialization switching element (e.g. T7) may have substantially the same timing, may overlap with each other, and/or may coincide.

The control electrode of the data initialization switching element (e.g. T4-1 and T4-2) may be connected to the control electrode of the light emitting element initialization switching element (e.g. T7).

In FIG. 5, during a first duration DU1, the first node N1 and the storage capacitor CST may be initialized in response to the data initialization gate signal GI. During the first duration DU1, the anode electrode of the light emitting element EE may be initialized in response to the light emitting element initialization gate signal GB. During a second duration DU2, a threshold voltage |VTH| of the first pixel switching element T1 may be subtracted from the data voltage VDATA, and the resulted voltage may be written to the first node N1, in response to the data write gate signals GW and the compensation gate signal GC. During a third duration DU3, the light emitting element EE may emit the light in response to the emission signal EM so that the display panel 100 may display an image.

According embodiments, when an image displayed on the display panel 100 is a static image and/or when the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal so that the current leakage may be reduced. Advantageously, no flicker may be conspicuous in displayed images, so that the image display quality of the display panel 100 may be satisfactory.

Figure 6:
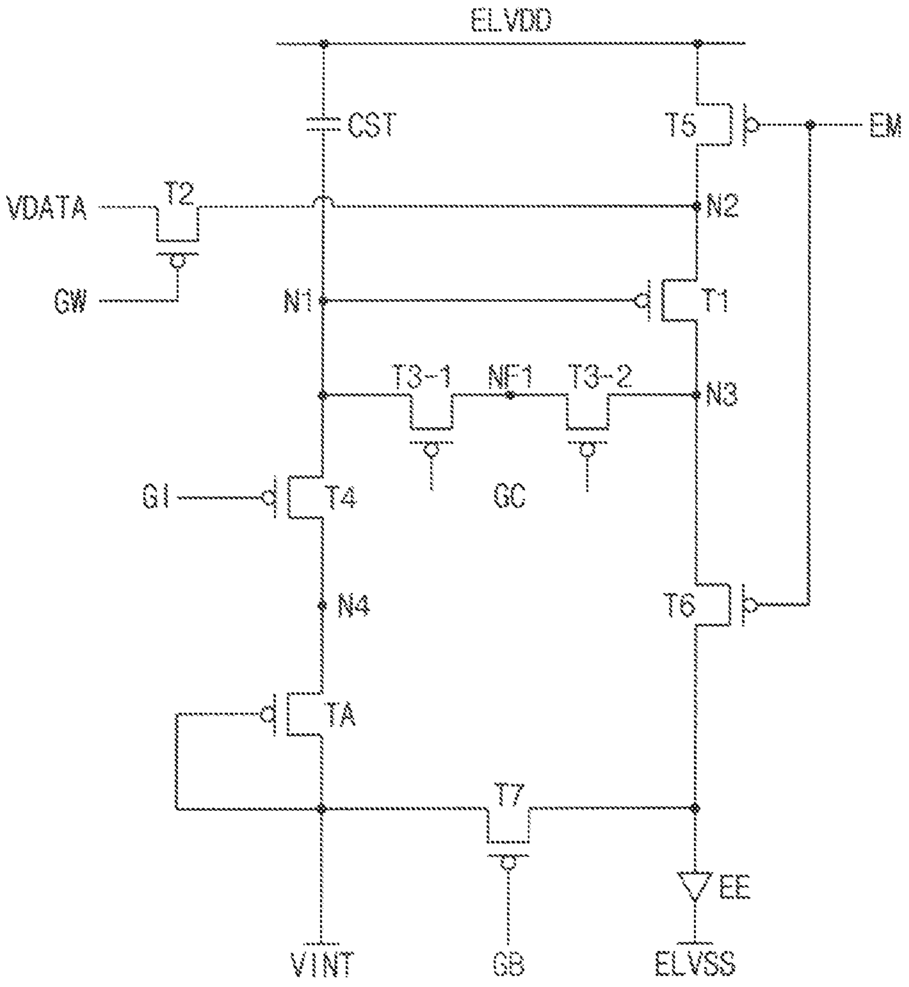
FIG. 6 is a circuit diagram illustrating a pixel of a display panel of a display apparatus according to an embodiment.

FIG. 6 is a circuit diagram illustrating a pixel of a display panel of a display apparatus according to an embodiment.

The display apparatus associated with FIG. 6 is substantially the same as the display apparatus described with reference to FIGS. 1 to 3 except for the structure of the pixel.

Referring to FIGS. 1 and 6, the display panel 100 includes pixels analogous to the pixel of FIG. 6. Each pixel includes a light emitting element EE.

The pixel receives a data write gate signal GW, a compensation/adjustment gate signal GC, a data initialization gate signal GI, a light emitting element initialization gate signal GB, the data voltage VDATA, and the emission signal EM; the light emitting element EE of the pixel emits light corresponding to the level of the data voltage VDATA to display an image.

The pixel may include first to seventh pixel switching elements T1 to T7, a compensation switching element TA, a storage capacitor CST and the light emitting element EE.

The first pixel switching element T1 includes a control electrode connected to a first node N1, an input electrode connected to a second node N2 and an output electrode connected to a third node N3.

The second pixel switching element T2 includes a control electrode receiving the data write gate signal GW, an input electrode receiving the data voltage VDATA, and an output electrode connected to the second node N2.

The third pixel switching element T3-1 and T3-2 includes a control electrode receiving the compensation gate signal GC, an input electrode connected to the first node N1 and an output electrode connected to the third node N3.

The third pixel switching element T3-1 and T3-2 may include two transistors connected in series. The third pixel switching element T3-1 and T3-2 may include a 3-1 pixel switching element T3-1 including a control electrode receiving the compensation gate signal GC, an input electrode connected to the first node N1 and an output electrode connected to a first floating node NF1 and a 3-2 pixel switching element T3-2 including a control electrode receiving the compensation gate signal GC, an input electrode connected to the first floating node NF1 and an output electrode connected to the third node N3.

The fourth pixel switching element T4 may be disposed between the control electrode of the first pixel switching element T1 and the initialization voltage terminal.

The fourth pixel switching element T4 may be a single transistor instead of two transistors.

The fourth pixel switching element T4 may include a control electrode receiving the data initialization gate signal GI, an input electrode connected to a fourth node N4, and an output electrode connected to the first node N1.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD and an output electrode connected to the second node N2.

The sixth pixel switching element T6 includes a control electrode receiving the emission signal EM, an input electrode connected to the third node N3 and an output electrode connected to an anode electrode of the light emitting element EE.

The seventh pixel switching element T7 includes a control electrode receiving the light emitting element initialization gate signal GB, an input electrode receiving the initialization voltage VINT and an output electrode connected to the anode electrode of the light emitting element EE.

The first to seventh pixel switching elements T1 to T7 may be P-type thin film transistors. The control electrodes of the first to seventh pixel switching elements T1 to T7 may be gate electrodes, the input electrodes of the first to seventh pixel switching elements T1 to T7 may be source electrodes and the output electrodes of the first to seventh pixel switching elements T1 to T7 may be drain electrodes.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the image display quality of the display panel 100 may be satisfactory.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include any floating node between data initialization transistors. Thus, current leakage may be minimized, so that the display quality of the display panel 100 may be satisfactory.

Figure 7:
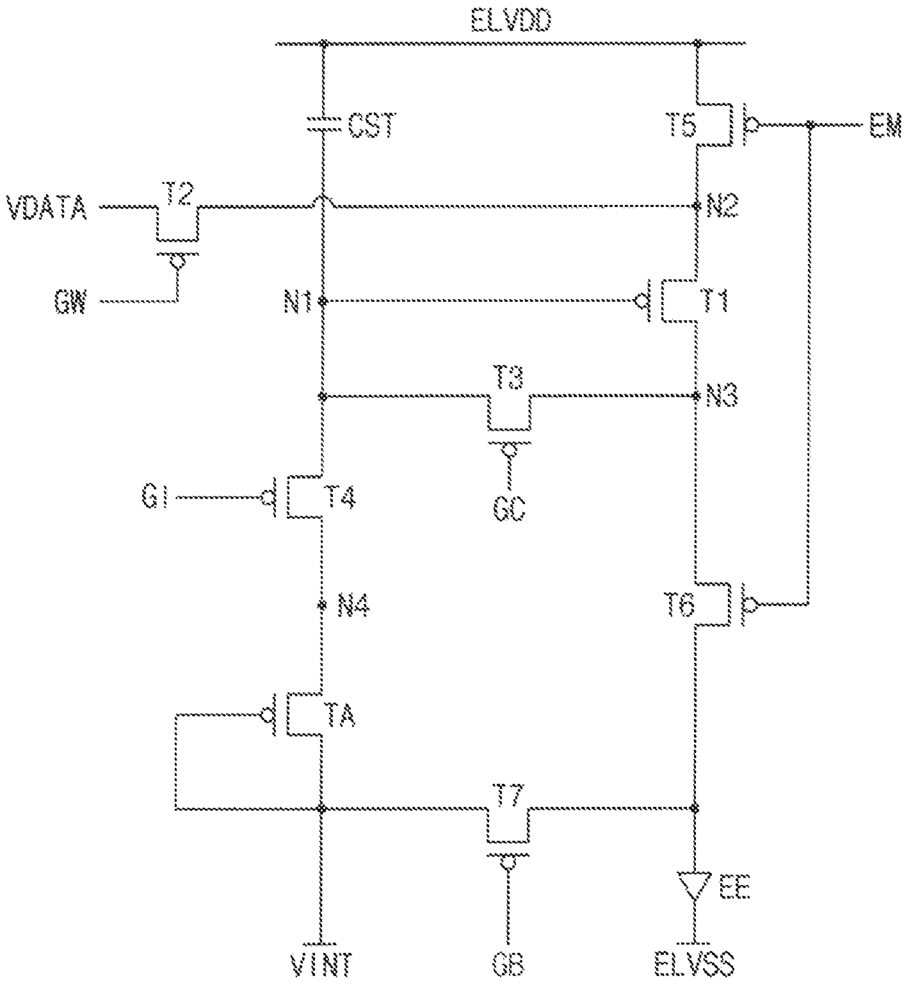
FIG. 7 is a circuit diagram illustrating a pixel of a display panel of a display apparatus according to an embodiment.

FIG. 7 is a circuit diagram illustrating a pixel of a display panel of a display apparatus according to an embodiment.

The display apparatus associated with FIG. 7 is substantially the same as the display apparatus described with reference to FIGS. 1 to 3 except for the structure of the pixel.

Referring to FIGS. 1 and 7, the display panel 100 includes pixels analogous to the pixel of FIG. 7. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM; the light emitting element EE of the pixel emits light corresponding to the level of the data voltage VDATA to display an image.

The pixel may include first to seventh pixel switching elements T1 to T7, a compensation switching element TA, a storage capacitor CST and the light emitting element EE.

The first pixel switching element T1 includes a control electrode connected to a first node N1, an input electrode connected to a second node N2 and an output electrode connected to a third node N3.

The second pixel switching element T2 includes a control electrode receiving the data write gate signal GW, an input electrode receiving the data voltage VDATA and an output electrode connected to the second node N2.

The third pixel switching element T3 includes a control electrode receiving the compensation gate signal GC, an input electrode connected to the first node N1 and an output electrode connected to the third node N3.

The third pixel switching element T3 may be a single transistor instead of two transistors.

The fourth pixel switching element T4 may be disposed between the control electrode of the first pixel switching element T1 and the initialization voltage terminal.

The fourth pixel switching element T4 may be a single transistor instead of two transistors.

The fourth pixel switching element T4 may include a control electrode receiving the data initialization gate signal GI, an input electrode connected to a fourth node N4, and an output electrode connected to the first node N1.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD, and an output electrode connected to the second node N2.

The sixth pixel switching element T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE.

The first to seventh pixel switching elements T1 to T7 may be P-type thin film transistors. The control electrodes of the first to seventh pixel switching elements T1 to T7 may be gate electrodes, the input electrodes of the first to seventh pixel switching elements T1 to T7 may be source electrodes and the output electrodes of the first to seventh pixel switching elements T1 to T7 may be drain electrodes.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be satisfactory.

The data initialization switching element T4 disposed between the driving switching element and the initialization voltage terminal is a single transistor instead of two transistors and the compensation switching element TA is connected to the data initialization switching element T4 in series so that the data initialization switching element T4 may not include any floating node between data initialization transistors. Thus, current leakage may be minimized, so that the display quality of the display panel 100 may be satisfactory.

Figure 8:
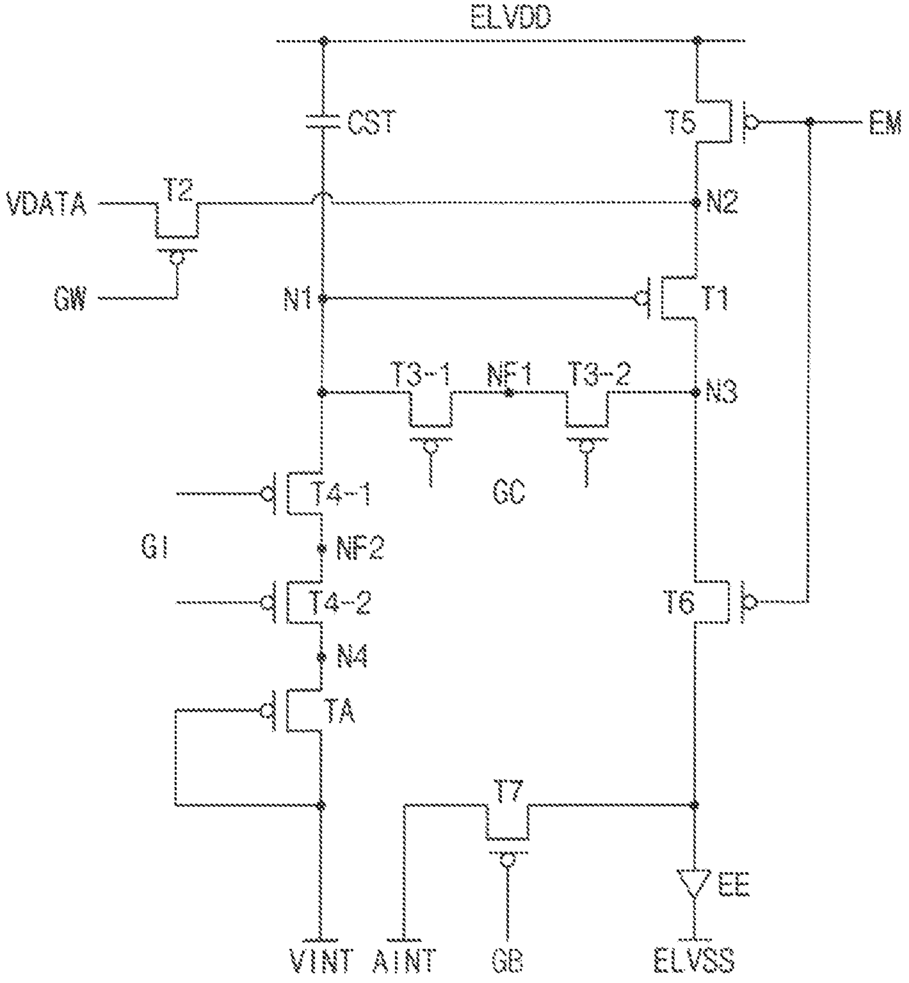
FIG. 8 is a circuit diagram illustrating a pixel of a display panel of a display apparatus according to an embodiment.

FIG. 8 is a circuit diagram illustrating a pixel of a display panel of a display apparatus according to an embodiment.

The display apparatus associated with FIG. 8 is substantially the same as the display apparatus described with reference to FIGS. 1 to 3 except for the structure of the pixel.

Referring to FIGS. 1 and 8, the display panel 100 includes pixels analogous to the pixel of FIG. 8. Each pixel includes a light emitting element EE.

The pixel receives a data write gate signal GW, a compensation gate signal GC, a data initialization gate signal GI, a light emitting element initialization gate signal GB, the data voltage VDATA and the emission signal EM and the light emitting element EE of the pixel emits light corresponding to the level of the data voltage VDATA to display an image.

The pixel structure of FIG. 8 is substantially the same as the pixel structure of FIG. 2 except that a second initialization voltage AINT applied to the seventh pixel switching element T7 has a level different from a level of the initialization voltage VINT applied to the compensation switching element TA.

The level of the initialization voltage VINT may be greater/higher than the level of the second initialization voltage AINT.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be satisfactory.

Figure 9:
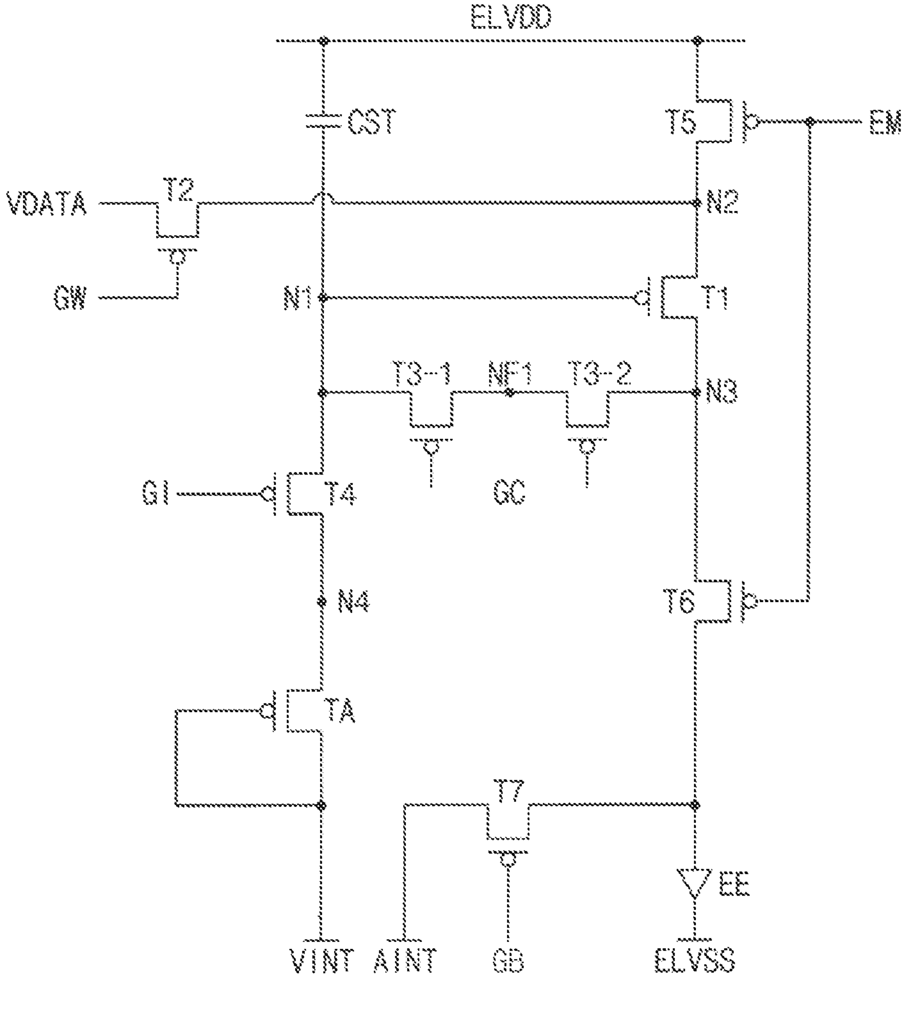
FIG. 9 is a circuit diagram illustrating a pixel of a display panel of a display apparatus according to an embodiment.

FIG. 9 is a circuit diagram illustrating a pixel of a display panel of a display apparatus according to an embodiment.

The display apparatus associated with FIG. 9 is substantially the same as the display apparatus described with reference to FIG. 6 except for the structure of the pixel.

Referring to FIGS. 1 and 9, the display panel 100 includes pixels analogous to the pixel of FIG. 9. Each pixel includes a light emitting element EE.

The pixel receives a data write gate signal GW, a compensation gate signal GC, a data initialization gate signal GI, a light emitting element initialization gate signal GB, the data voltage VDATA and the emission signal EM and the light emitting element EE of the pixel emits light corresponding to the level of the data voltage VDATA to display an image.

The pixel structure of embodiments is substantially the same as the pixel structure of FIG. 6 except that a second initialization voltage AINT applied to the seventh pixel switching element T7 has a level different from a level of the initialization voltage VINT applied to the compensation switching element TA.

The level of the initialization voltage VINT may be greater than the level of the second initialization voltage AINT.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be satisfactory.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include any floating node between data initialization transistors. Thus, current leakage may be minimized, so that the display quality of the display panel 100 may be satisfactory.

Figure 10:
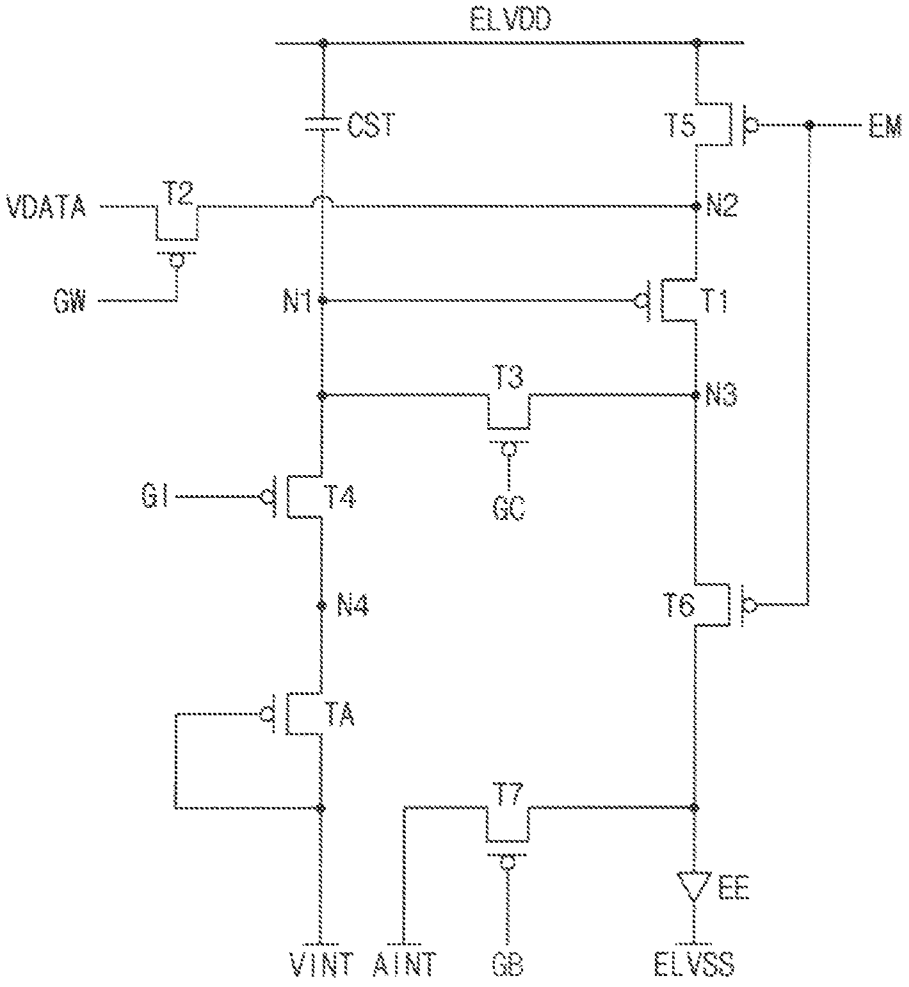
FIG. 10 is a circuit diagram illustrating a pixel of a display panel of a display apparatus according to an embodiment.

FIG. 10 is a circuit diagram illustrating a pixel of a display panel of a display apparatus according to an embodiment.

The display apparatus associated with FIG. 10 is substantially the same as the display apparatus described with reference to FIG. 7 except for the structure of the pixel.

Referring to FIGS. 1 and 10, the display panel 100 includes pixels analogous to the pixel of FIG. 10. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM; the light emitting element EE of the pixel emits light corresponding to the level of the data voltage VDATA to display an image.

The pixel structure of embodiments is substantially the same as the pixel structure of FIG. 7 except that a second initialization voltage AINT applied to the seventh pixel switching element T7 has a level different from a level of the initialization voltage VINT applied to the compensation switching element TA.

The level of the initialization voltage VINT may be greater than the level of the second initialization voltage AINT.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be enhanced.

The data initialization switching element T4 disposed between the driving switching element and the initialization voltage terminal is a single transistor instead of two transistors and the compensation switching element TA is connected to the data initialization switching element T4 in series so that the data initialization switching element T4 may not include any floating node between data initialization transistors. Thus, current leakage may be minimized, so that the display quality of the display panel 100 may be satisfactory.

Figure 11:
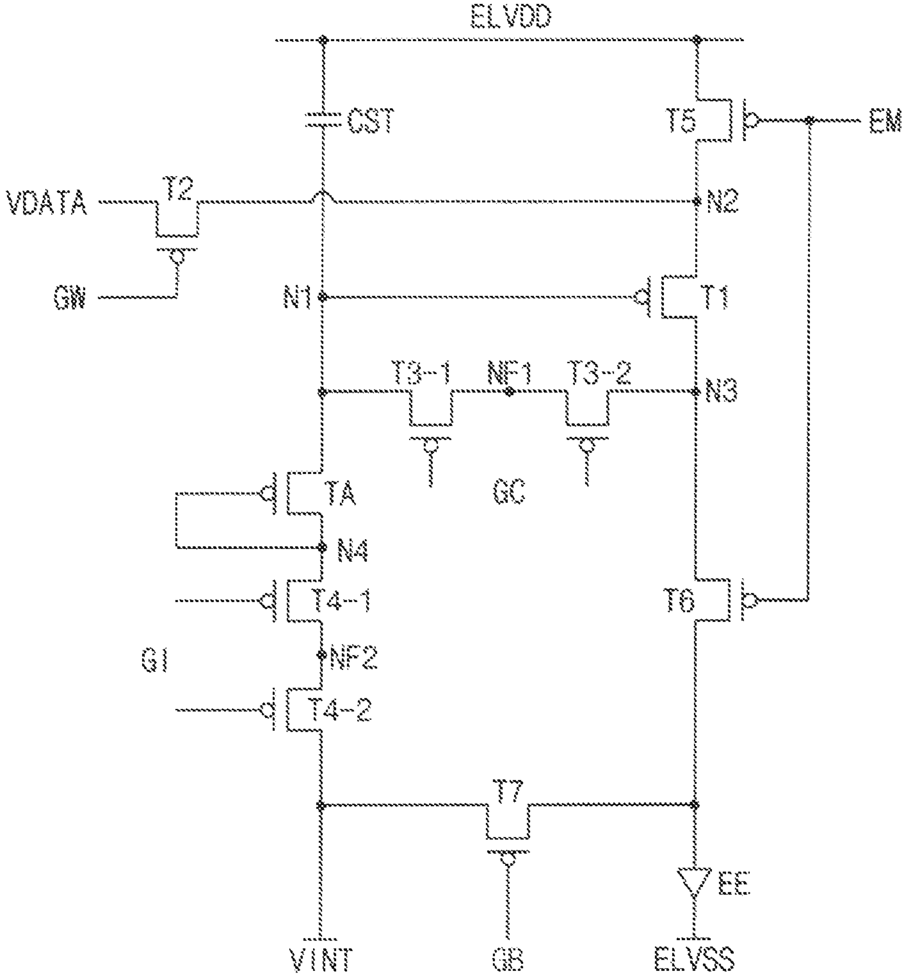
FIG. 11 is a circuit diagram illustrating a pixel of a display panel of a display apparatus according to an embodiment.

FIG. 11 is a circuit diagram illustrating a pixel of a display panel of a display apparatus according to an embodiment.

The display apparatus associated with FIG. 11 is substantially the same as the display apparatus described with reference to FIGS. 1 to 3 except for the structure of the pixel.

Referring to FIGS. 1 and 11, the display panel 100 includes pixels analogous to the pixel of FIG. 11. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM; the light emitting element EE of the pixel emits light corresponding to the level of the data voltage VDATA to display an image.

The pixel structure of embodiments is substantially the same as the pixel structure of FIG. 2 except that the compensation switching element TA is disposed between the first node N1 and the data initialization switching element T4-1 and T4-2.

The data initialization switching element T4-1 and T4-2 may be disposed between the input electrode of the compensation switching element TA and the initialization voltage terminal. The compensation switching element TA may be disposed between the control electrode N1 of the driving switching element T1 and the output electrode of the data initialization switching element T4-1 and T4-2. The data initialization switching element may include a first data initialization switching element T4-1 and a second data initialization switching element T4-2.

The 4-1 pixel switching element T4-1 may include a control electrode receiving a data initialization gate signal GI, an input electrode connected to a second floating node NF2, and an output electrode connected to a fourth node N4. The 4-2 pixel switching element T4-2 may include a control electrode receiving the data initialization gate signal GI, an input electrode connected to the initialization gate terminal, and an output electrode connected to the second floating node NF2. The compensation switching element TA may include a control electrode connected to the fourth node N4, an input electrode connected to the fourth node N4, and an output electrode connected to the first node N1.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be enhanced.

Figure 12:
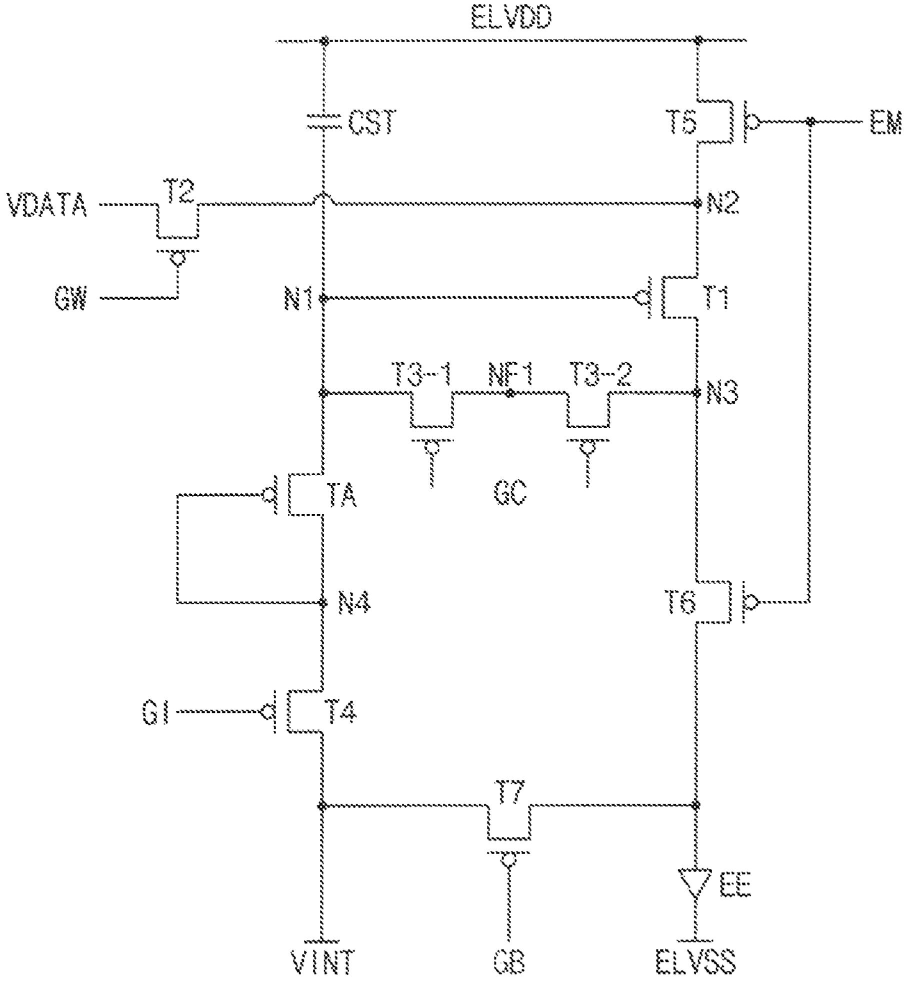
FIG. 12 is a circuit diagram illustrating a pixel of a display panel of a display apparatus according to an embodiment.

FIG. 12 is a circuit diagram illustrating a pixel of a display panel of a display apparatus according to an embodiment.

The display apparatus associated with FIG. 12 is substantially the same as the display apparatus described with reference to FIG. 6 except for the structure of the pixel.

Referring to FIGS. 1 and 12, the display panel 100 includes pixels analogous to the pixel of FIG. 12. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel structure of FIG. 12 is substantially the same as the pixel structure of FIG. 6 except that the compensation switching element TA is disposed between the first node N1 and the data initialization switching element T4.

The data initialization switching element T4 may be disposed between the input electrode of the compensation switching element TA and the initialization voltage terminal. The compensation switching element TA may be disposed between the control electrode N1 of the driving switching element T1 and the output electrode of the data initialization switching element T4.

The fourth pixel switching element T4 may include a control electrode receiving a data initialization gate signal GI, an input electrode connected to the initialization gate terminal, and an output electrode connected to a fourth node N4. The compensation switching element TA may include a control electrode connected to the fourth node N4, an input electrode connected to the fourth node N4, and an output electrode connected to the first node N1.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be enhanced.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include a floating node between two transistors. Thus, current leakage may be minimized, so that the display quality of the display panel 100 may be satisfactory.

Figure 13:
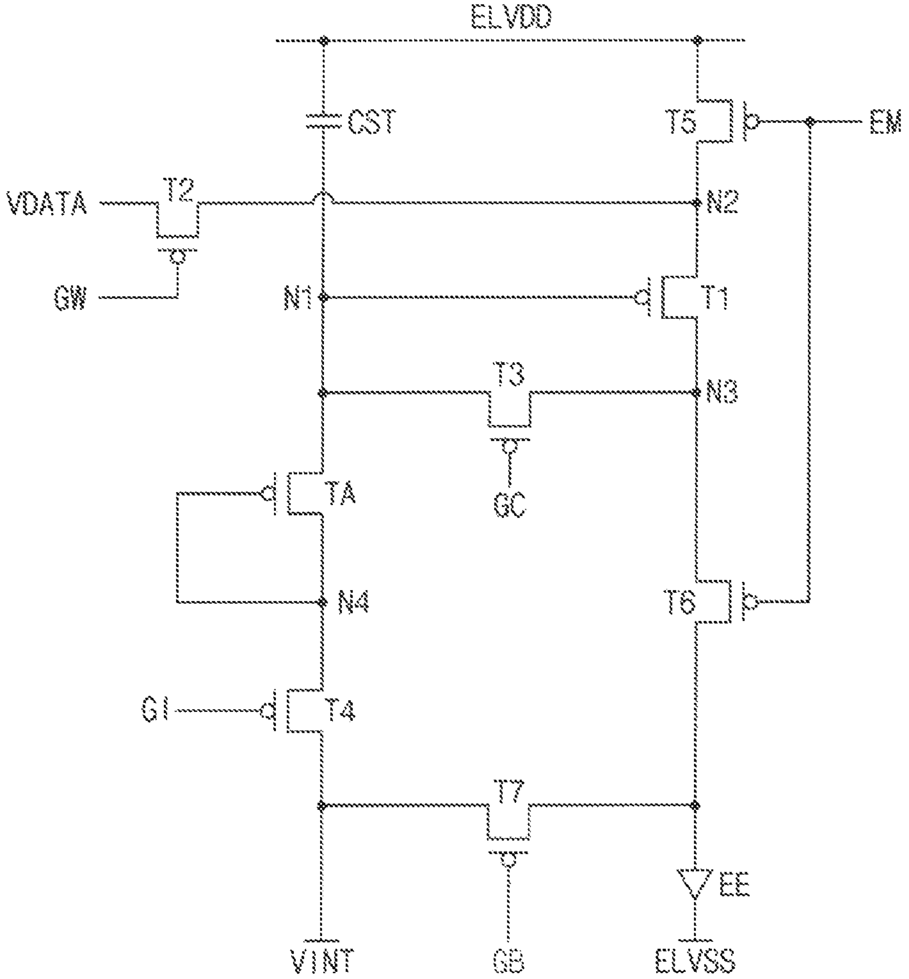
FIG. 13 is a circuit diagram illustrating a pixel of a display panel of a display apparatus according to an embodiment.

FIG. 13 is a circuit diagram illustrating a pixel of a display panel of a display apparatus according to an embodiment.

The display apparatus associated with FIG. 13 is substantially the same as the display apparatus described with reference to FIG. 7 except for the structure of the pixel.

Referring to FIGS. 1 and 13, the display panel 100 includes pixels analogous to the pixel of FIG. 13. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel structure of FIG. 13 is substantially the same as the pixel structure of FIG. 7 except that the compensation switching element TA is disposed between the first node N1 and the data initialization switching element T4.

The data initialization switching element T4 may be disposed between the input electrode of the compensation switching element TA and the initialization voltage terminal. The compensation switching element TA may be disposed between the control electrode N1 of the driving switching element T1 and the output electrode of the data initialization switching element T4.

The fourth pixel switching element T4 may include a control electrode receiving a data initialization gate signal GI, an input electrode connected to the initialization gate terminal, and an output electrode connected to a fourth node N4. The compensation switching element TA may include a control electrode connected to the fourth node N4, an input electrode connected to the fourth node N4 and an output electrode connected to the first node N1.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal so that the current leakage may be reduced. Advantageously, the display quality of the display panel 100 may be enhanced.

The data initialization switching element T4 disposed between the driving switching element and the initialization voltage terminal is a single transistor instead of two transistors and the compensation switching element TA is connected to the data initialization switching element T4 in series so that the data initialization switching element T4 may not include a floating node between two transistors. Thus, current leakage may be minimized, so that the display quality of the display panel 100 may be satisfactory.

Figure 14:
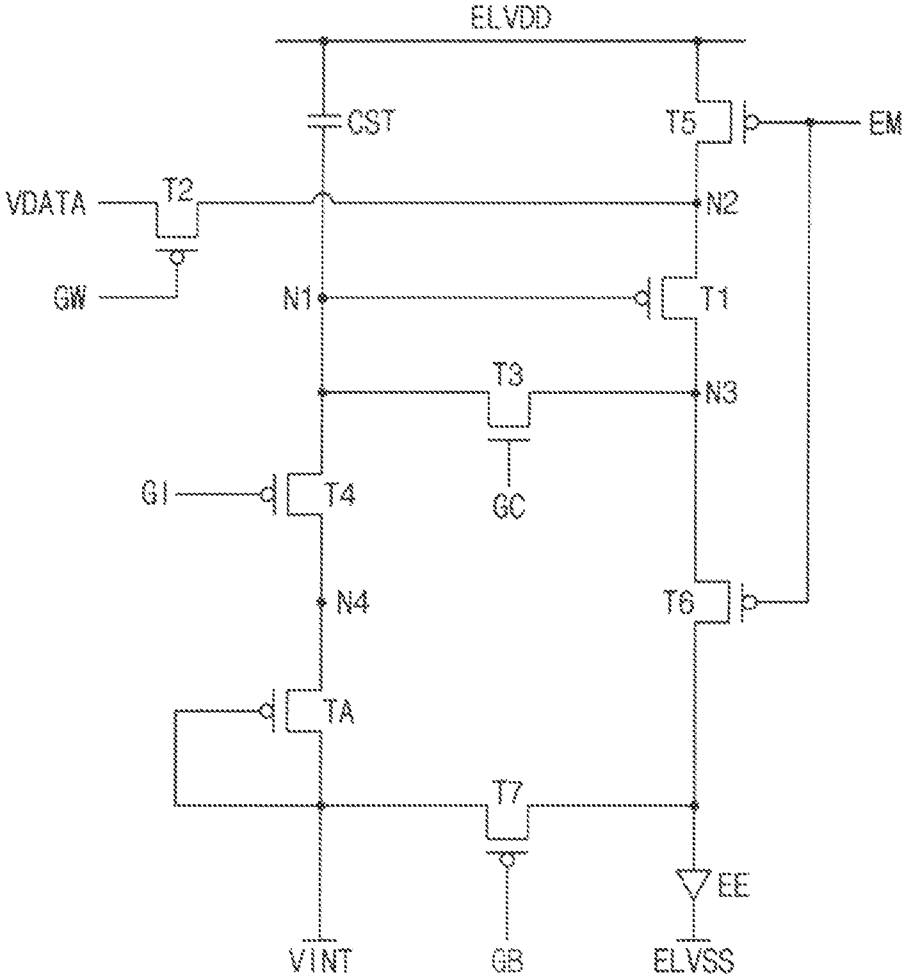
FIG. 14 is a circuit diagram illustrating a pixel of a display panel of a display apparatus according to an embodiment.
Figure 15:
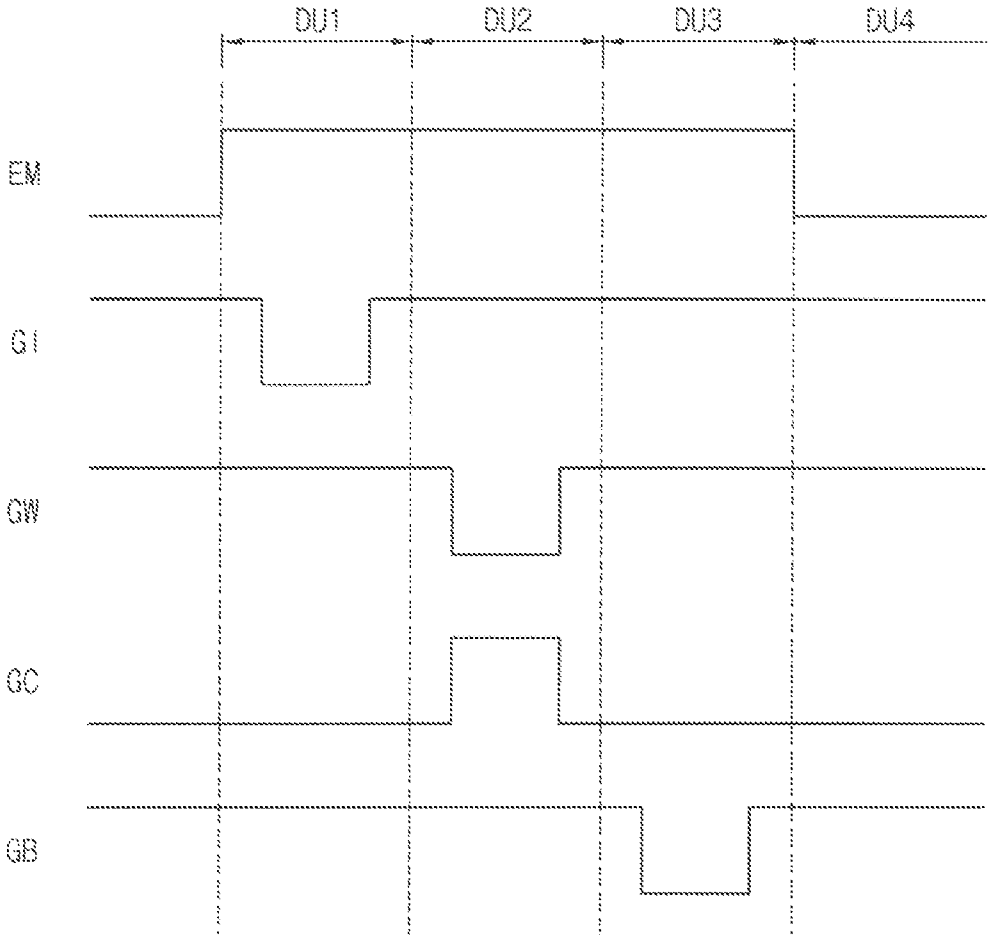
FIG. 15 is a timing diagram illustrating input signals applied to the pixel of FIG. 14 according to an embodiment.

FIG. 14 is a circuit diagram illustrating a pixel of a display panel of a display apparatus according to an embodiment. FIG. 15 is a timing diagram illustrating input signals applied to the pixel of FIG. 14 according to an embodiment.

The display apparatus associated with FIG. 14 is substantially the same as the display apparatus described with reference to FIGS. 1 to 3 except for the structure of the pixel and the input signals applied to the pixel.

Referring to FIGS. 1, 14, and 15, the display panel 100 includes pixels analogous to the pixel of FIG. 14. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include first to seventh pixel switching elements T1 to T7, a compensation switching element TA, a storage capacitor CST, and the light emitting element EE.

The pixel may include at least one P-type transistor and at least one N-type transistor. The first pixel switching element T1, the second pixel switching element T2, the fourth to seventh pixel switching elements T4 to T7, and the compensation switching element TA may be P-type transistors. The third pixel switching element T3 may be an N-type transistor.

The first pixel switching element T1 includes a control electrode connected to a first node N1, an input electrode connected to a second node N2, and an output electrode connected to a third node N3.

The second pixel switching element T2 includes a control electrode receiving the data write gate signal GW, an input electrode receiving the data voltage VDATA, and an output electrode connected to the second node N2.

The third pixel switching element T3 includes a control electrode receiving the compensation gate signal GC, an input electrode connected to the first node N1, and an output electrode connected to the third node N3.

The third pixel switching element T3 may be a single transistor instead of two transistors. The third pixel switching element T3 may be an N-type transistor.

As shown in FIG. 15, an active level of the compensation gate signal GC may be a high level since the third pixel switching element T3 is an N-type transistor. A length of the active period of the compensation gate signal GC may be greater than or equal to a length of the active period of the data write gate signal GW.

The fourth pixel switching element T4 may be disposed between the control electrode of the first pixel switching element T1 and the initialization voltage terminal.

The fourth pixel switching element T4 may be a single transistor instead of two transistors. The fourth pixel switching element may be two transistors connected to each other in series like T4-1 and T4-2 illustrated in FIG. 2.

The fourth pixel switching element T4 may include a control electrode receiving the data initialization gate signal GI, an input electrode connected to a fourth node N4, and an output electrode connected to the first node N1.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD, and an output electrode connected to the second node N2.

The sixth pixel switching element T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE. Alternatively, a second initialization voltage (e.g., AINT in FIG. 8) having the level different from the level of the initialization voltage VINT may be applied to the input electrode of the seventh pixel switching element T7.

In FIG. 15, the timing of the active period of the light emitting element initialization gate signal GB, the timing of the active period of the data write gate signal GW, and the timing of the active period of the data initialization gate signal GI may be different from one another. Alternatively, the active period of the light emitting element initialization gate signal GB and the active period of the data write gate signal GW may have substantially the same timing, like FIG. 4. Alternatively, the active period of the light emitting element initialization gate signal GB and the active period of the data initialization gate signal GI may have substantially the same timing, like FIG. 5.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be satisfactory.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include a floating node between two transistors. Thus, current leakage may be minimized, so that the display quality of the display panel 100 may be satisfactory.

Figure 16:
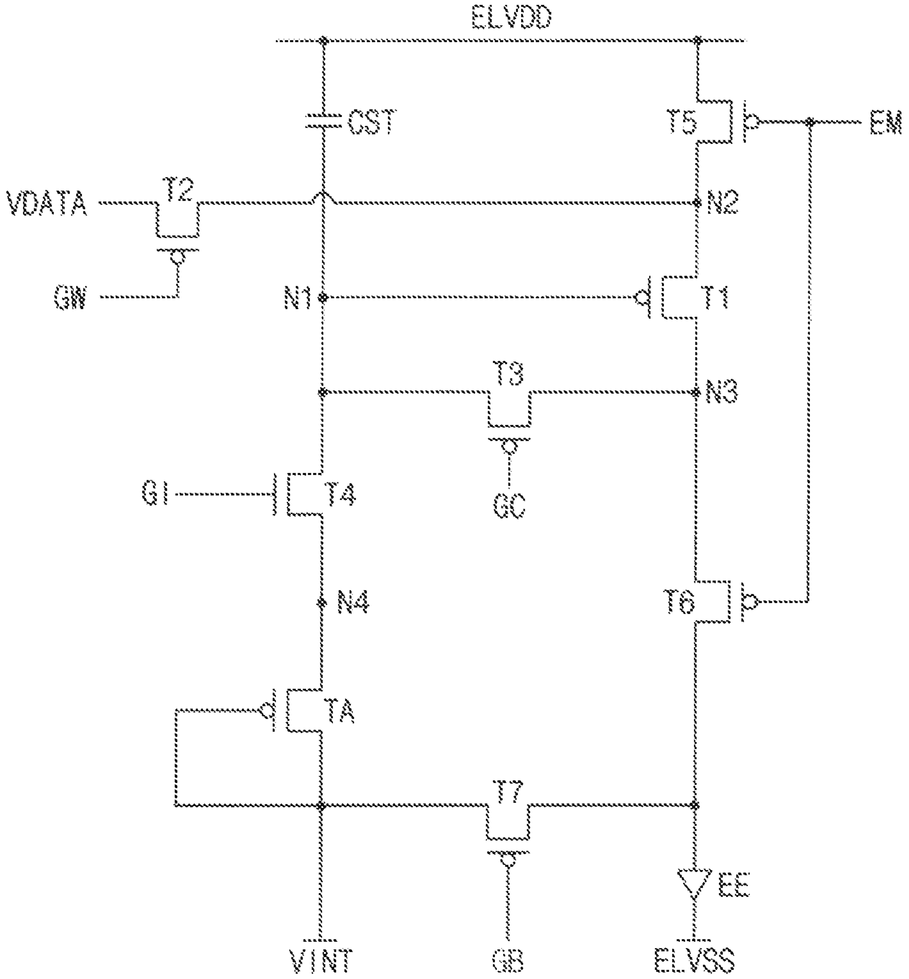
FIG. 16 is a circuit diagram illustrating a pixel of a display panel of a display apparatus according to an embodiment.
Figure 17:
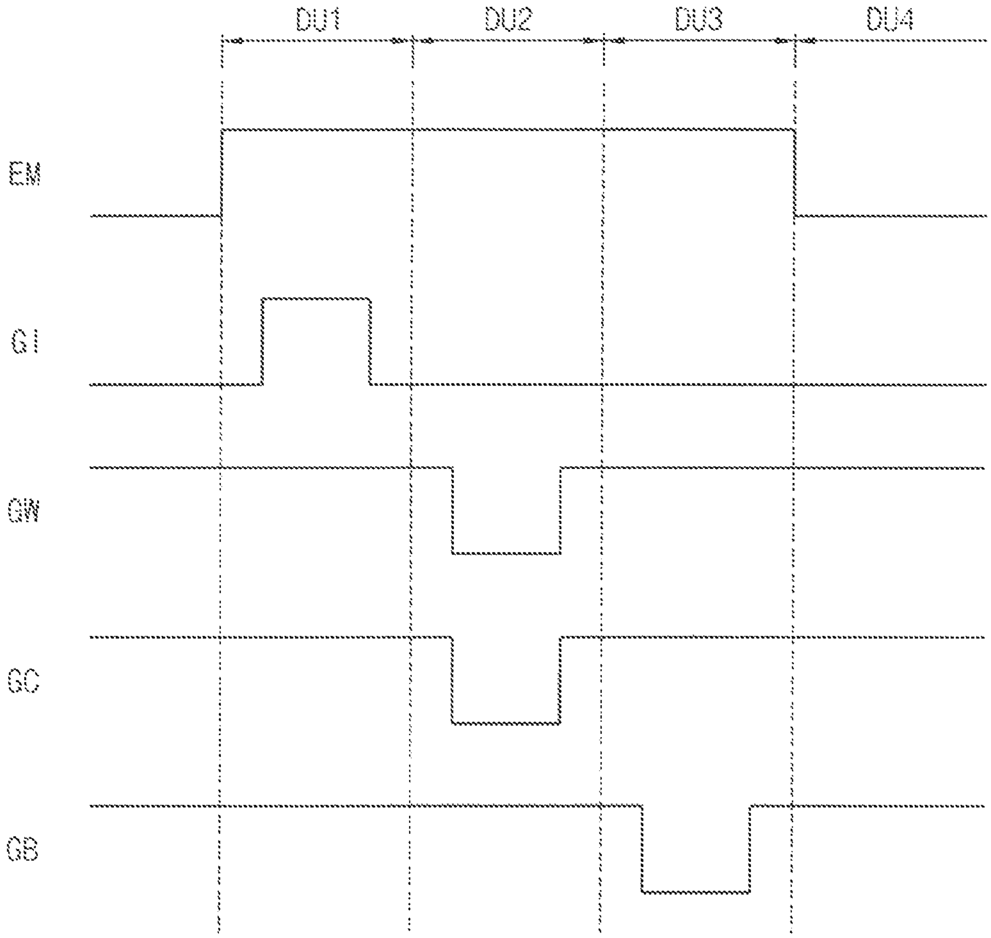
FIG. 17 is a timing diagram illustrating input signals applied to the pixel of FIG. 16 according to an embodiment.

FIG. 16 is a circuit diagram illustrating a pixel of a display panel of a display apparatus according to an embodiment. FIG. 17 is a timing diagram illustrating input signals applied to the pixel of FIG. 16 according to an embodiment.

The display apparatus according to associated with FIG. 16 is substantially the same as the display apparatus described with reference to FIGS. 1 to 3 except for the structure of the pixel and the input signals applied to the pixel.

Referring to FIGS. 1, 16, and 17, the display panel 100 includes pixels analogous to the pixel of FIG. 16. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include first to seventh pixel switching elements T1 to T7, a compensation switching element TA, a storage capacitor CST, and the light emitting element EE.

The pixel may include at least one P-type transistor and at least one N-type transistor. The first to third pixel switching elements T1 to T3, the fifth to seventh pixel switching elements T5 to T7, and the compensation switching element TA may be P-type transistors. The fourth pixel switching element T4 may be an N-type transistor.

The first pixel switching element T1 includes a control electrode connected to a first node N1, an input electrode connected to a second node N2, and an output electrode connected to a third node N3.

The second pixel switching element T2 includes a control electrode receiving the data write gate signal GW, an input electrode receiving the data voltage VDATA, and an output electrode connected to the second node N2.

The third pixel switching element T3 includes a control electrode receiving the compensation gate signal GC, an input electrode connected to the first node N1, and an output electrode connected to the third node N3.

The third pixel switching element T3 may be a single transistor instead of two transistors. Alternatively, the third pixel switching element may be two transistors connected to each other in series, like T3-1 and T3-2 illustrated in FIG. 2.

The fourth pixel switching element T4 may be disposed between the control electrode of the first pixel switching element T1 and the initialization voltage terminal.

The fourth pixel switching element T4 may include a control electrode receiving the data initialization gate signal GI, an input electrode connected to a fourth node N4, and an output electrode connected to the first node N1.

The fourth pixel switching element T4 may be a single transistor instead of two transistors. The fourth pixel switching element T4 may be an N-type transistor.

As shown in FIG. 17, an active level of the data initialization gate signal GI may be a high level since the fourth pixel switching element T4 is an N-type transistor.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD, and an output electrode connected to the second node N2.

The sixth pixel switching element T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE. Alternatively, a second initialization voltage (e.g., AINT in FIG. 8) having the level different from the level of the initialization voltage VINT may be applied to the input electrode of the seventh pixel switching element T7.

In FIG. 17, the timing of the active period of the light emitting element initialization gate signal GB, the timing of the active period of the data write gate signal GW, and the timing of the active period of the data initialization gate signal GI may be different from one another. Alternatively, the active period of the light emitting element initialization gate signal GB and the active period of the data write gate signal GW may have substantially the same timing, like FIG. 4. Alternatively, the active period of the light emitting element initialization gate signal GB and the active period of the data initialization gate signal GI may have substantially the same timing, like FIG. 5.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the display quality of the display panel 100 may be enhanced.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include a floating node between two transistors. Thus, current leakage may be minimized, so that the display quality of the display panel 100 may be satisfactory.

Figure 18:
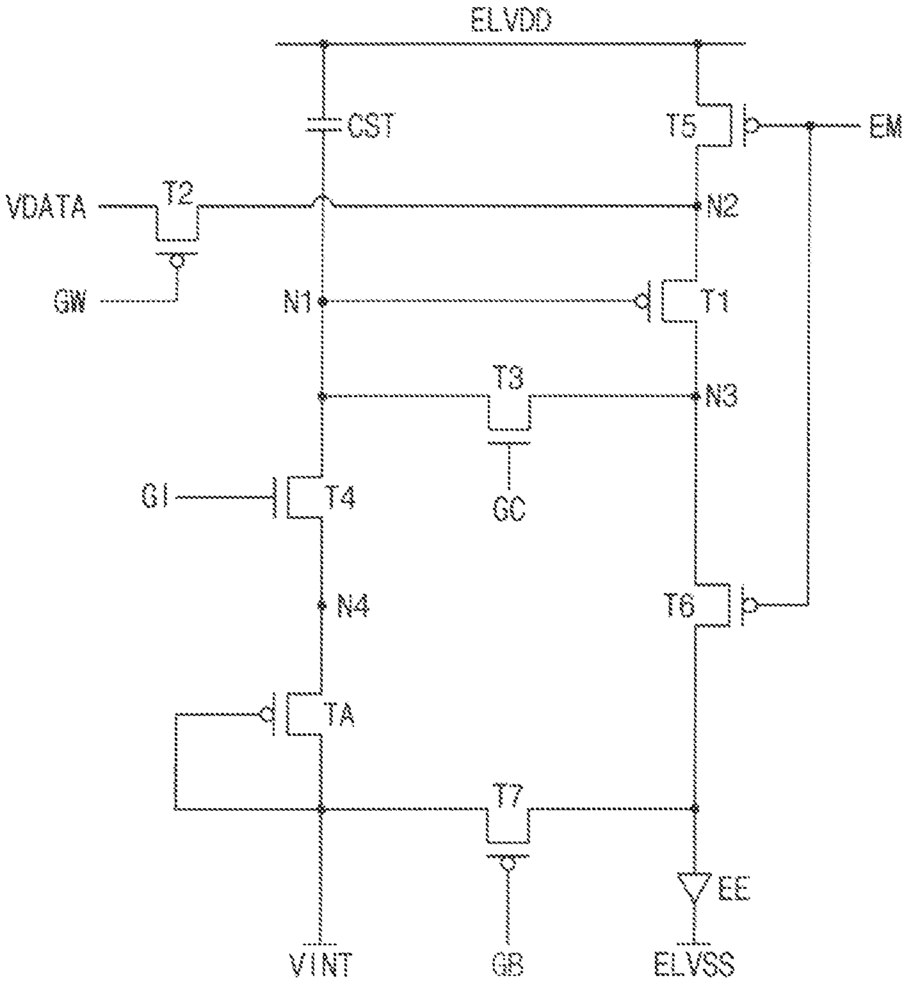
FIG. 18 is a circuit diagram illustrating a pixel of a display panel of a display apparatus according to an embodiment.
Figure 19:
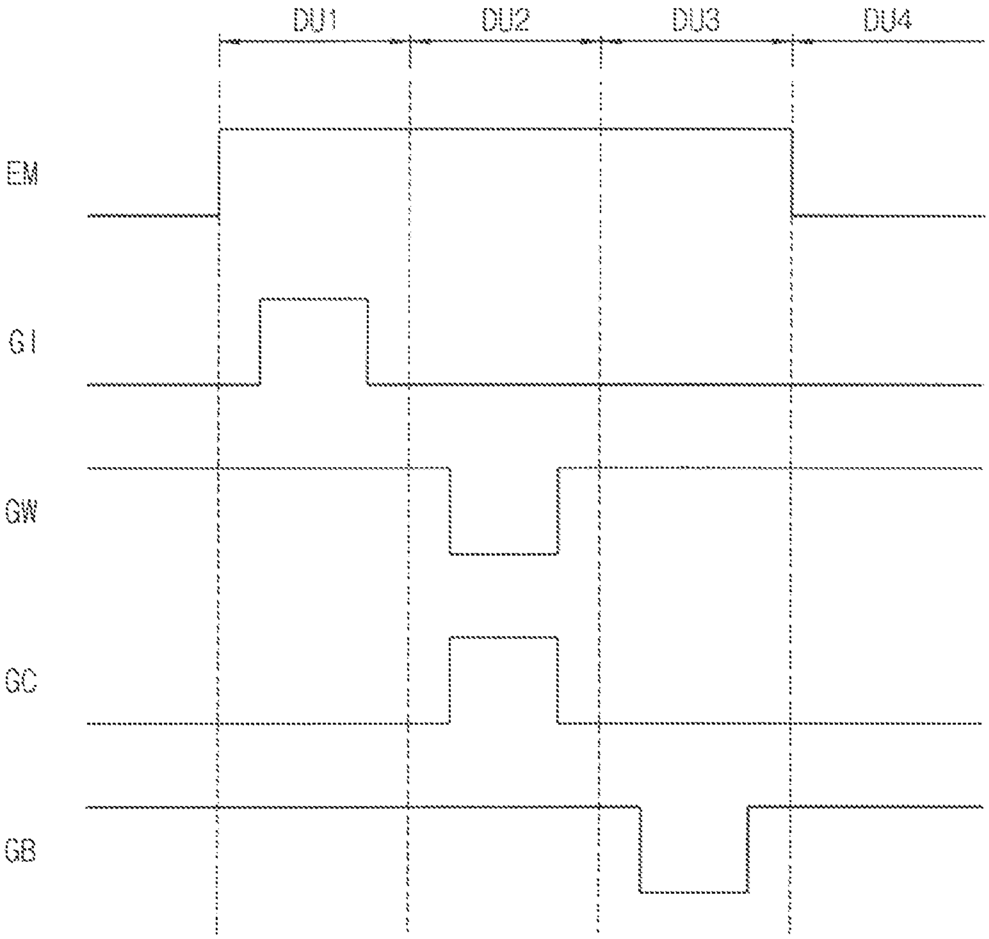
FIG. 19 is a timing diagram illustrating input signals applied to the pixel of FIG. 18 according to an embodiment.

FIG. 18 is a circuit diagram illustrating a pixel of a display panel of a display apparatus according to an embodiment. FIG. 19 is a timing diagram illustrating input signals applied to the pixel of FIG. 18 according to an embodiment.

The display apparatus according to FIG. 18 is substantially the same as the display apparatus described with reference to FIGS. 1 to 3 except for the structure of the pixel and the input signals applied to the pixel.

Referring to FIGS. 1, 18, and 19, the display panel 100 includes pixels analogous to the pixel of FIG. 18. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include first to seventh pixel switching elements T1 to T7, a compensation switching element TA, a storage capacitor CST, and the light emitting element EE.

The pixel may include P-type transistors and N-type transistors. The first pixel switching element T1, the second pixel switching element T2, the fourth to seventh pixel switching elements T5 to T7, and the compensation switching element TA may be P-type transistors. The third pixel switching element T3 and the fourth pixel switching element T4 may be N-type transistors.

The first pixel switching element T1 includes a control electrode connected to a first node N1, an input electrode connected to a second node N2, and an output electrode connected to a third node N3.

The second pixel switching element T2 includes a control electrode receiving the data write gate signal GW, an input electrode receiving the data voltage VDATA, and an output electrode connected to the second node N2.

The third pixel switching element T3 includes a control electrode receiving the compensation gate signal GC, an input electrode connected to the first node N1, and an output electrode connected to the third node N3.

The third pixel switching element T3 may be a single transistor instead of two transistors. The third pixel switching element T3 may be an N-type transistor.

As shown in FIG. 19, an active level of the compensation gate signal GC may be a high level since the third pixel switching element T3 is an N-type transistor. A length of the active period of the compensation gate signal GC may be greater than or equal to a length of the active period of the data write gate signal GW.

The fourth pixel switching element T4 may be disposed between the control electrode of the first pixel switching element T1 and the initialization voltage terminal.

The fourth pixel switching element T4 may include a control electrode receiving the data initialization gate signal GI, an input electrode connected to a fourth node N4, and an output electrode connected to the first node N1.

The fourth pixel switching element T4 may be a single transistor instead of two transistors. The fourth pixel switching element T4 may be an N-type transistor.

As shown in FIG. 19, an active level of the data initialization gate signal GI may be a high level since the fourth pixel switching element T4 is an N-type transistor.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD, and an output electrode connected to the second node N2.

The sixth pixel switching element T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE. Alternatively, a second initialization voltage (e.g., AINT in FIG. 8) having the level different from the level of the initialization voltage VINT may be applied to the input electrode of the seventh pixel switching element T7.

In FIG. 19, the timing of the active period of the light emitting element initialization gate signal GB, the timing of the active period of the data write gate signal GW, and the timing of the active period of the data initialization gate signal GI may be different from one another. Alternatively, the active period of the light emitting element initialization gate signal GB and the active period of the data write gate signal GW may have substantially the same timing, like FIG. 4. Alternatively, the active period of the light emitting element initialization gate signal GB and the active period of the data initialization gate signal GI may have substantially the same timing, like FIG. 5.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the image display quality of the display panel 100 may be satisfactory.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include any floating node between data initialization transistors. Thus, current leakage may be minimized, so that the image display quality of the display panel 100 may be satisfactory.

Figure 20:
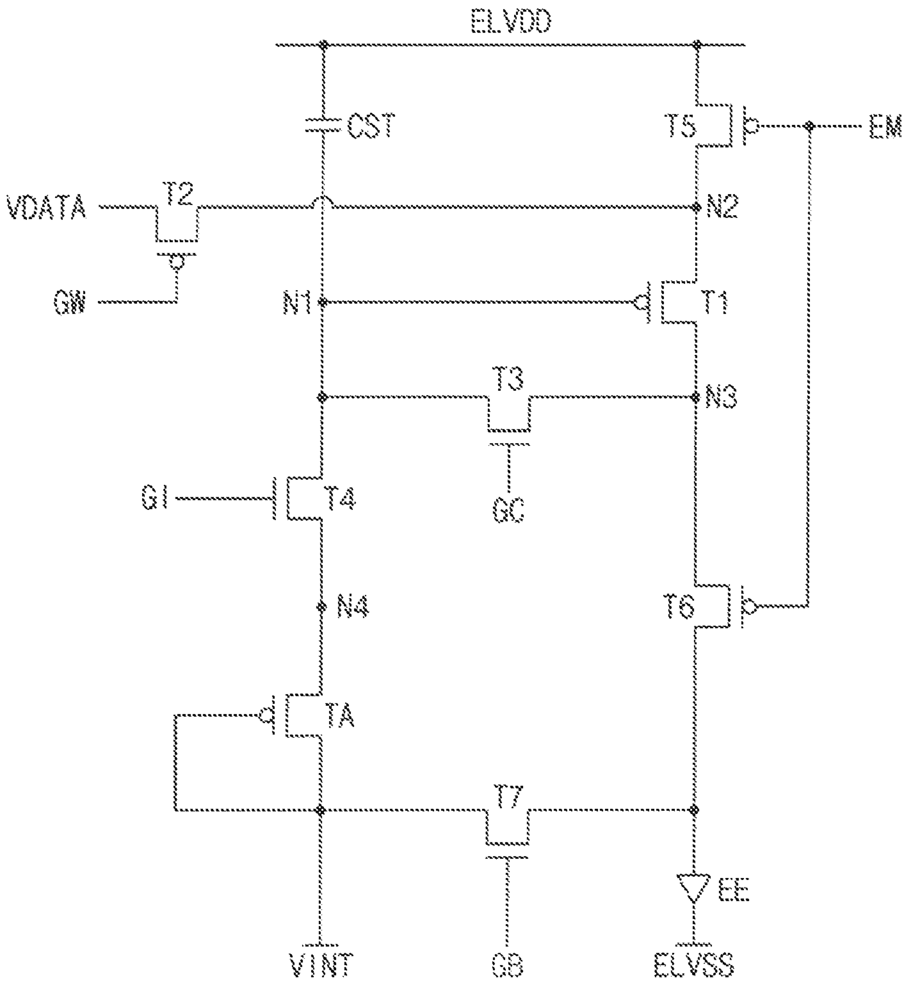
FIG. 20 is a circuit diagram illustrating a pixel of a display panel of a display apparatus according to an embodiment.
Figure 21:
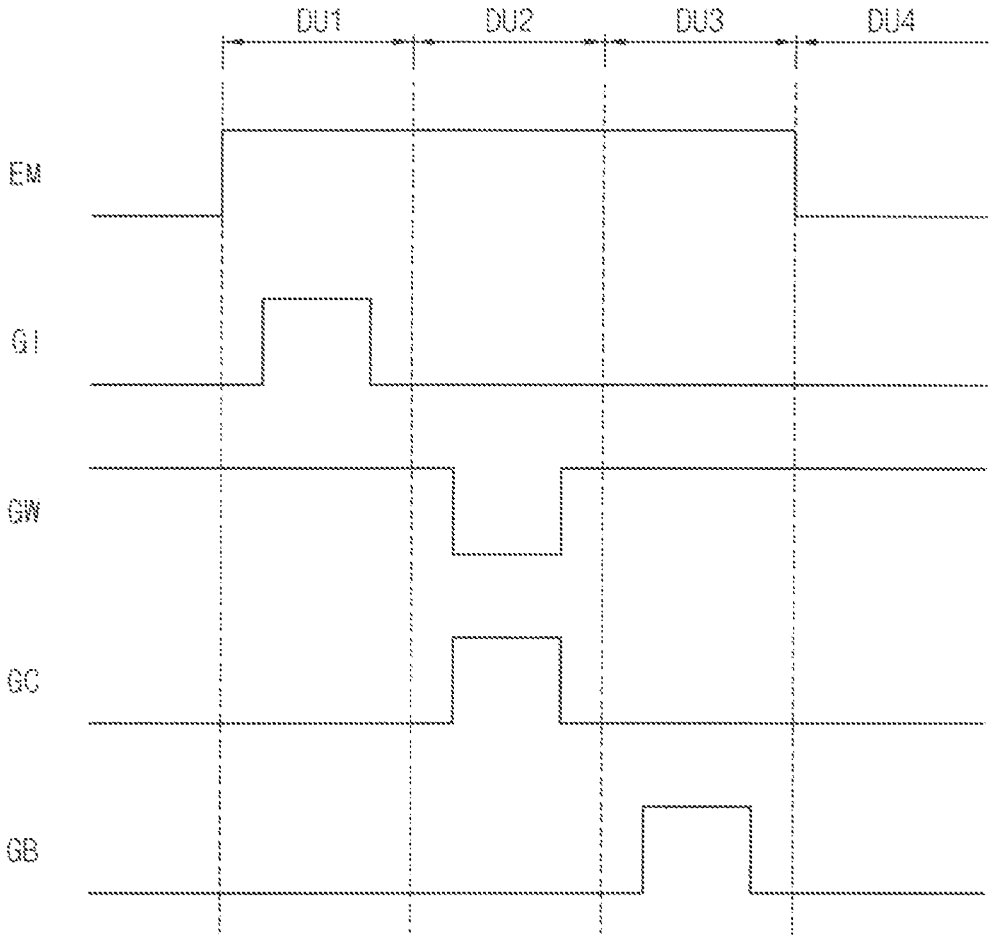
FIG. 21 is a timing diagram illustrating input signals applied to the pixel of FIG. 20 according to an embodiment.

FIG. 20 is a circuit diagram illustrating a pixel of a display panel of a display apparatus according to an embodiment. FIG. 21 is a timing diagram illustrating input signals applied to the pixel of FIG. 20 according to an embodiment.

The display apparatus according to FIG. 20 is substantially the same as the display apparatus described with reference to FIGS. 1 to 3 except for the structure of the pixel and the input signals applied to the pixel.

Referring to FIGS. 1, 20, and 21, the display panel 100 includes pixels analogous to the pixel of FIG. 20. Each pixel includes a light emitting element EE.

The pixel receives a data write gate signal GW, a compensation gate signal GC, a data initialization gate signal GI, a light emitting element initialization gate signal GB, the data voltage VDATA, and the emission signal EM. The light emitting element EE of the pixel emits light corresponding to the level of the data voltage VDATA to display an image.

The pixel may include first to seventh pixel switching elements T1 to T7, a compensation switching element TA, a storage capacitor CST, and the light emitting element EE.

The pixel may include P-type transistors and N-type transistors. The first pixel switching element T1, the second pixel switching element T2, the fifth pixel switching element T5, the sixth pixel switching element T6 and the compensation switching element TA may be P-type transistors. The third pixel switching element T3, the fourth pixel switching element T4 and the seventh pixel switching element T7 may be N-type transistors.

The first pixel switching element T1 includes a control electrode connected to a first node N1, an input electrode connected to a second node N2, and an output electrode connected to a third node N3.

The second pixel switching element T2 includes a control electrode receiving the data write gate signal GW, an input electrode receiving the data voltage VDATA, and an output electrode connected to the second node N2.

The third pixel switching element T3 includes a control electrode receiving the compensation gate signal GC, an input electrode connected to the first node N1, and an output electrode connected to the third node N3.

The third pixel switching element T3 may be a single transistor instead of two transistors. The third pixel switching element T3 may be an N-type transistor.

As shown in FIG. 21, an active level of the compensation gate signal GC may be a high level since the third pixel switching element T3 is an N-type transistor. A length of the active period of the compensation gate signal GC may be greater than or equal to a length of the active period of the data write gate signal GW.

The fourth pixel switching element T4 may be disposed between the control electrode of the first pixel switching element T1 and the initialization voltage terminal.

The fourth pixel switching element T4 may include a control electrode receiving the data initialization gate signal GI, an input electrode connected to a fourth node N4, and an output electrode connected to the first node N1.

The fourth pixel switching element T4 may be a single transistor instead of two transistors. The fourth pixel switching element T4 may be an N-type transistor.

As shown in FIG. 21, an active level of the data initialization gate signal GI may be a high level since the fourth pixel switching element T4 is an N-type transistor.

The compensation switching element TA may be disposed between the control electrode of the driving switching element (e.g. T1) and the initial voltage terminal. The compensation switching element TA may be connected to the data initialization switching element T4 in series. A control electrode of the compensation switching element TA may be connected to an input electrode of the compensation switching element TA.

The fifth pixel switching element T5 includes a control electrode receiving the emission signal EM, an input electrode receiving a first power voltage ELVDD, and an output electrode connected to the second node N2.

The sixth pixel switching element T6 includes a control electrode receiving the emission signal EM, an input electrode connected to the third node N3, and an output electrode connected to an anode electrode of the light emitting element EE.

The seventh pixel switching element T7 includes a control electrode receiving the light emitting element initialization gate signal GB, an input electrode receiving the initialization voltage VINT, and an output electrode connected to the anode electrode of the light emitting element EE. Alternatively, a second initialization voltage (e.g., AINT in FIG. 8) having the level different from the level of the initialization voltage VINT may be applied to the input electrode of the seventh pixel switching element T7.

The seventh pixel switching element T7 may be an N-type transistor.

As shown in FIG. 21, an active level of the light emitting element initialization gate signal GB may be a high level since the seventh pixel switching element T7 is an N-type transistor.

In FIG. 21, the timing of the active period of the light emitting element initialization gate signal GB, the timing of the active period of the data write gate signal GW, and the timing of the active period of the data initialization gate signal GI may be different from one another. Alternatively, the active period of the light emitting element initialization gate signal GB and the active period of the data write gate signal GW may have substantially the same timing, like FIG. 4. Alternatively, the active period of the light emitting element initialization gate signal GB and the active period of the data initialization gate signal GI may have substantially the same timing, like FIG. 5.

The storage capacitor CST includes a first electrode receiving the first power voltage ELVDD and a second electrode connected to the first node N1.

The light emitting element EE includes the anode electrode and a cathode electrode receiving a second power voltage ELVSS. The second power voltage ELVSS may be less than the first power voltage ELVDD.

According to embodiments, when an image displayed on the display panel 100 is a static image or the display panel 100 is operated in always on mode, the driving frequency of the display panel 100 may be decreased to reduce a power consumption of the display apparatus.

The pixel includes the compensation switching element TA disposed between the control electrode of the driving switching element T1 and the initialization voltage terminal, so that the current leakage may be reduced. Advantageously, the image display quality of the display panel 100 may be satisfactory.

The data initialization switching element T4 disposed between the driving switching element and the initialization voltage terminal is a single transistor instead of two transistors, and the compensation switching element TA is connected to the data initialization switching element T4 in series, so that the data initialization switching element T4 may not include any floating node between two transistors. Thus, current leakage may be minimized, so that the display quality of the display panel 100 may be satisfactory.

According to embodiments, the power consumption of a display apparatus may be reduced, and the quality of images displayed by the display panel may be satisfactory.

Although a few embodiments have been described, many modifications are possible in the embodiments. All such modifications are within the scope defined by the claims.

What is claimed is:

1. A pixel comprising:

a light emitting element;

a driving switching element configured to provide a driving current to the light emitting element, wherein the driving switching element is a first pixel switching element;

an initialization voltage terminal;

a data initialization switching element set;

an adjustment switching element electrically connected to the data initialization switching element set in series, wherein at least one of the data initialization switching element set and the adjustment switching element controls an electrical connection between the control electrode of the driving switching element and the initialization voltage terminal, and wherein a control electrode of the adjustment switching element is electrically connected to an input electrode of the adjustment switching element;

a writing switching element configured to provide a data voltage to an input electrode of the driving switching element, wherein the writing switching element is a second pixel switching element, wherein a control electrode of the second pixel switching element receives a data write gate signal;

a third pixel switching element including a control electrode configured to receive a gate compensation signal, an input electrode connected to an output electrode of the driving switching element, and an output electrode connected to a gate electrode of the driving switching element; and a light emitting element initialization switching element configured to initialize an anode of the light emitting element at an initialization voltage that equals a sum of a threshold voltage of the light emitting element and a second power voltage applied to a cathode of the light emitting element, wherein the second pixel switching element includes a p-type transistor and the third pixel switching element includes an n-type transistor, and wherein in operation the pixel is driven at a lower frequency than a normal frequency when a static image is displayed or when in an always on mode.

2. The pixel of claim 1, wherein a timing of an active period of a first gate signal provided to a control electrode of the data initialization switching element set, a timing of an active period of a second gate signal provided to a control electrode of the writing switching element, and a timing of an active period of a third gate signal provided to a control electrode of the light emitting element initialization switching element are different from one another.

3. The pixel of claim 1, wherein a timing of an active period of a first gate signal provided to a control electrode of the data initialization switching element set is different from a timing of an active period of a second gate signal provided to a control electrode of the writing switching element, and wherein the active period of the second gate signal coincides with an active period of a third gate signal provided to a control electrode of the light emitting element initialization switching element.

4. The pixel of claim 1, wherein a timing of an active period of a first gate signal provided to a control electrode of the data initialization switching element set is different from a timing of an active period of a second gate signal provided to a control electrode of the writing switching element, and wherein the active period of the first gate signal coincides with an active period of a third gate signal provided to a control electrode of the light emitting element initialization switching element.

5. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes a first intermediary switching element including a control electrode configured to receive a first instance of an adjustment gate signal, an input electrode electrically connected to the first node, and an output electrode electrically connected to a first floating node, wherein the third pixel switching element includes a second intermediary switching element including a control electrode configured to receive a second instance of the adjustment gate signal, an input electrode electrically connected to the first floating node, and an output electrode electrically connected to the third node, wherein the cathode of the light emitting element is configured to receive the second power voltage, wherein the data initialization switching element set includes a first data initialization switching element and a second data initialization switching element, wherein the first data initialization switching element includes a control electrode configured to receive a first instance of a data initialization gate signal, an input electrode electrically connected to a second floating node, and an output electrode electrically connected to the first node, wherein the second data initialization switching element includes a control electrode configured to receive a second instance of the data initialization gate signal, an input electrode electrically connected to the fourth node, and an output electrode connected to the second floating node, wherein the input electrode of the adjustment switching element is electrically connected to the initialization voltage terminal, and wherein an output electrode of the adjustment switching element is electrically connected to the fourth node.

6. The pixel of claim 5, further comprising:

a storage capacitor including a first electrode configured to receive the first power voltage and a second electrode electrically connected to the first node.

7. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes a first intermediary switching element including a control electrode configured to receive a first instance of an adjustment gate signal, an input electrode electrically connected to the first node, and an output electrode electrically connected to a first floating node, wherein the third pixel switching element includes a second intermediary switching element including a control electrode configured to receive a second instance of the adjustment gate signal, an input electrode electrically connected to the first floating node, and an output electrode electrically connected to the third node, wherein the cathode of the light emitting element is configured to receive the second power voltage, wherein the data initialization switching element set includes a control electrode configured to receive a data initialization gate signal, an input electrode electrically connected to the fourth node, and an output electrode electrically connected to the first node, wherein the input electrode of the adjustment switching element is electrically connected to the initialization voltage terminal, and wherein an output electrode of the adjustment switching element is electrically connected to the fourth node.

8. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes an intermediary pixel switching element including a control electrode configured to receive an adjustment gate signal, an input electrode electrically connected to the first node, and an output electrode electrically connected to the third node, wherein the cathode of the light emitting element is configured to receive the second power voltage, wherein the data initialization switching element set includes a control electrode configured to receive a data initialization gate signal, an input electrode electrically connected to the fourth node, and an output electrode electrically connected to the first node, wherein the input electrode of the adjustment switching element is electrically connected to the initialization voltage terminal, and wherein an output electrode of the adjustment switching element is electrically connected to the fourth node.

9. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

a second initialization voltage terminal;

the light emitting element initialization switching element including a control electrode configured to receive a light emitting element initialization gate signal, an input electrode connected to the second initialization voltage terminal, and an output electrode connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes a first intermediary switching element including a control electrode configured to receive a first instance of an adjustment gate signal, an input electrode electrically connected to the first node, and an output electrode electrically connected to a first floating node, wherein the third pixel switching element includes a second intermediary switching element including a control electrode configured to receive a second instance of the adjustment gate signal, an input electrode electrically connected to the first floating node, and an output electrode electrically connected to the third node, wherein the cathode of the light emitting element is configured to receive the second power voltage, wherein the data initialization switching element set includes a first data initialization switching element and a second data initialization switching element, wherein the first data initialization switching element includes a control electrode configured to receive a first instance of a data initialization gate signal, an input electrode electrically connected to a second floating node, and an output electrode electrically connected to the first node, wherein the second data initialization switching element includes a control electrode configured to receive a second instance of the data initialization gate signal, an input electrode electrically connected to the fourth node, and an output electrode connected to the second floating node, wherein the input electrode of the adjustment switching element is electrically connected to the initialization voltage terminal, and wherein an output electrode of the adjustment switching element is electrically connected to the fourth node.

10. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

a second initialization voltage terminal;

the light emitting element initialization switching element including a control electrode configured to receive a light emitting element initialization gate signal, an input electrode electrically connected to the second initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes a first intermediary switching element including a control electrode configured to receive a first instance of an adjustment gate signal, an input electrode electrically connected to the first node, and an output electrode electrically connected to a first floating node, wherein the third pixel switching element includes a second intermediary switching element including a control electrode configured to receive a second instance of the adjustment gate signal, an input electrode electrically connected to the first floating node, and an output electrode electrically connected to the third node, wherein the cathode of the light emitting element is configured to receive the second power voltage, wherein the data initialization switching element set includes a control electrode configured to receive a data initialization gate signal, an input electrode electrically connected to the fourth node, and an output electrode electrically connected to the first node, wherein the input electrode of the adjustment switching element is electrically connected to the initialization voltage terminal, and wherein an output electrode of the adjustment switching element is electrically connected to the fourth node.

11. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, a second initialization voltage terminal;

the light emitting element initialization switching element including a control electrode configured to receive a light emitting element initialization gate signal, an input electrode electrically connected to the second initialization voltage terminal, and an output electrode connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes an intermediary pixel switching element including a control electrode configured to receive an adjustment gate signal, an input electrode electrically connected to the first node, and an output electrode electrically connected to the third node, wherein the cathode of the light emitting element is configured to receive the second power voltage, wherein the data initialization switching element set includes a control electrode configured to receive a data initialization gate signal, an input electrode electrically connected to the fourth node, and an output electrode electrically connected to the first node, wherein the input electrode of the adjustment switching element is electrically connected to the initialization voltage terminal, and wherein an output electrode of the adjustment switching element is electrically connected to the fourth node.

12. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes a first intermediary switching element including a control electrode configured to receive a first instance of an adjustment gate signal, an input electrode electrically connected to the first node, and an output electrode electrically connected to a first floating node, wherein the third pixel switching element includes a second intermediary switching element including a control electrode configured to receive a second instance of the adjustment gate signal, an input electrode electrically connected to the first floating node, and an output electrode electrically connected to the third node, wherein the cathode of the light emitting element is configured to receive the second power voltage, wherein the data initialization switching element set includes a first data initialization switching element and a second data initialization switching element, wherein the first data initialization switching element includes a control electrode configured to receive a first instance of a data initialization gate signal, an input electrode electrically connected to a second floating node, and an output electrode electrically connected to the fourth node, wherein the second data initialization switching element includes a control electrode configured to receive a second instance of the data initialization gate signal, an input electrode electrically connected to the initialization voltage terminal, and an output electrode connected to the second floating node, wherein the input electrode of the adjustment switching element is electrically connected to the fourth node, and wherein an output electrode of the adjustment switching element is electrically connected to the first node.

13. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element including a control electrode configured to receive a data write gate signal, an input electrode configured to receive a data voltage, and an output electrode electrically connected to the second node;

wherein the third pixel switching element includes a first intermediary switching element including a control electrode configured to receive a first instance of an adjustment gate signal, an input electrode electrically connected to the first node, and an output electrode electrically connected to a first floating node;

wherein the third pixel switching element includes a second intermediary switching element including a control electrode configured to receive a second instance of the adjustment gate signal, an input electrode electrically connected to the first floating node, and an output electrode electrically connected to the third node;

wherein the cathode of the light emitting element is configured to receive the second power voltage, wherein the data initialization switching element set includes a control electrode configured to receive a data initialization gate signal, an input electrode electrically connected to the initialization voltage terminal, and an output electrode electrically connected to the fourth node, wherein the input electrode of the adjustment switching element is electrically connected to the fourth node, and wherein an output electrode of the adjustment switching element is electrically connected to the first node.

14. The pixel of claim 1, further comprising:

a first node electrically connected to the control electrode of the driving switching element;

a second node electrically connected to an input electrode of the driving switching element;

a third node electrically connected to an output electrode of the driving switching element;

a first emission control switching element including a control electrode configured to receive a first instance of an emission signal, an input electrode configured to receive a first power voltage, and an output electrode electrically connected to the second node;

a second emission control switching element including a control electrode configured to receive a second instance of the emission signal, an input electrode electrically connected to the third node, and an output electrode connected to an anode electrode of the light emitting element;

the light emitting element initialization switching element including a control electrode configured to receive a light emitting element initialization gate signal, an input electrode connected to the initialization voltage terminal, and an output electrode electrically connected to the anode electrode of the light emitting element; and a fourth node, wherein the writing switching element includes a control electrode configured to receive a data write gate signal, an input electrode configured to receive a data voltage, and an output electrode electrically connected to the second node, wherein the third pixel switching element includes an intermediary switching element including a control electrode configured to receive an adjustment gate signal, an input electrode electrically connected to the first node, and an output electrode electrically connected to the third node, wherein the cathode of the light emitting element is configured to receive the second power voltage, wherein the data initialization switching element set includes a control electrode configured to receive a data initialization gate signal, an input electrode electrically connected to the initialization voltage terminal, and an output electrode electrically connected to the fourth node, wherein the input electrode of the adjustment switching element is electrically connected to the fourth node, and wherein an output electrode of the adjustment switching element is electrically connected to the first node.

15. A display apparatus comprising:

a display panel including a pixel;

a gate driver configured to output a gate signal to the pixel;

a data driver configured to output a data voltage to the pixel; and an emission driver configured to output an emission signal to the pixel, wherein the pixel comprises:

a light emitting element;

a driving switching element configured to provide a driving current to the light emitting element, wherein the driving switching element is a first pixel switching element;

an initialization voltage terminal;

a data initialization switching element set;

an adjustment switching element electrically connected to the data initialization switching element in series, wherein at least one of the data initialization switching element set and the adjustment switching element controls an electrical connection between the control electrode of the driving switching element and the initialization voltage terminal, and wherein a control electrode of the adjustment switching element is electrically connected to an input electrode of the adjustment switching element;

a writing switching element configured to provide a data voltage to an input electrode of the driving switching element, wherein the writing switching element is a second pixel switching element, wherein a control electrode of the second pixel switching element receives a data write gate signal;

a third pixel switching element including a control electrode configured to receive a gate compensation signal, an input electrode connected to an output electrode of the driving switching element, and an output electrode connected to a gate electrode of the driving switching element; and a light emitting element initialization switching element configured to initialize an anode of the light emitting element at an initialization voltage that equals a sum of a threshold voltage of the light emitting element and a second power voltage applied to a cathode of the light emitting element, wherein the second pixel switching element includes a p-type transistor and the third pixel switching element includes an n-type transistor, and wherein in operation the pixel is driven at a lower frequency than a normal frequency when a static image is displayed or when in an always on mode.

16. The display apparatus of claim 15, wherein the data initialization switching element set controls an electrical connection between the control electrode of the driving switching element and an output electrode of the adjustment switching element, and wherein the adjustment switching element controls an electrical connection between an input electrode of the data initialization switching element set and the initialization voltage terminal.

17. The display apparatus of claim 16, wherein the data initialization switching element set includes a first data initialization switching element and a second data initialization switching element that are electrically connected to each other in series.

18. The display apparatus of claim 15, wherein the data initialization switching element set controls an electrical connection between the input electrode of the adjustment switching element and the initialization voltage terminal, and wherein the adjustment switching element controls an electrical connection between the control electrode of the driving switching element and an output electrode of the data initialization switching element set.

* * * * *